(12) United States Patent
Qian et al.

(10) Patent No.: US 9,607,417 B2
(45) Date of Patent: Mar. 28, 2017

(54) PARALLEL RENDERING OF REGION-BASED GRAPHICS REPRESENTATIONS

(71) Applicant: CANON KABUSHIKI KAISHA, Tokyo (JP)

(72) Inventors: Lena Qunying Ye Qian, Artarmon (AU); Paul William Morrison, Erskine Park (AU); George Politis, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/574,642

(22) Filed: Dec. 18, 2014

(65) Prior Publication Data

US 2015/0178881 A1    Jun. 25, 2015

(30) Foreign Application Priority Data

Dec. 20, 2013  (AU) .................................. 2013273768

(51) Int. Cl.
| | | |
|---|---|---|
| *G09G 5/00* | (2006.01) | |
| *G06T 11/40* | (2006.01) | |
| *G06F 9/50* | (2006.01) | |
| *G06T 7/00* | (2017.01) | |
| *G06T 11/00* | (2006.01) | |
| *G06K 15/02* | (2006.01) | |

(52) U.S. Cl.
CPC .............. *G06T 11/40* (2013.01); *G06F 9/505* (2013.01); *G06K 15/1857* (2013.01); *G06T 7/0081* (2013.01); *G09G 5/00* (2013.01); *G06K 15/1849* (2013.01); *G06T 11/00* (2013.01)

(58) Field of Classification Search
CPC .... H04N 1/41; H04N 1/40062; H04N 1/4092; H04N 1/642; G06T 9/00; G06T 7/0081; G06F 3/1247; G06K 15/02
See application file for complete search history.

(56) References Cited

U.S. PATENT DOCUMENTS

| | | | |
|---|---|---|---|
| 6,049,390 A | 4/2000 | Notradame et al. | |
| 6,693,719 B1* | 2/2004 | Gupta | G06T 11/40 |
| | | | 358/1.1 |
| 8,203,747 B2 | 6/2012 | Owen | |
| 2005/0200867 A1* | 9/2005 | Faggion | G06T 11/40 |
| | | | 358/1.9 |
| 2009/0214231 A1* | 8/2009 | Nagai | G03G 15/5025 |
| | | | 399/27 |

(Continued)

*Primary Examiner* — Jacinta M Crawford
*Assistant Examiner* — Diane Wills
(74) *Attorney, Agent, or Firm* — Canon USA, Inc. I.P. Division

(57) ABSTRACT

A method of rendering an image using a number of threads, by receiving edge data for the image comprising edges identified by indices, each edge having edge scan line crossing coordinates, arranging the coordinates into partitions indexed by the indices to form a data structure that is randomly accessible by a coordinate of a portion of the image; each partition comprising a list of edge scan line crossing coordinates associated with an edge that is identified by the edge index indexing the partition, and rendering the portions of the image concurrently, using corresponding threads by identifying, by randomly accessing a partition in the indexing data structure using a coordinate of said portion in the image, at least one edge in the indexing data structure associated with said portion of the image.

18 Claims, 24 Drawing Sheets

(56) References Cited

U.S. PATENT DOCUMENTS

| | | | | |
|---|---|---|---|---|
| 2010/0149195 A1* | 6/2010 | Fernando | ............... | G06F 9/505 345/505 |
| 2010/0302564 A1* | 12/2010 | Ozawa | ............... | G06K 15/1849 358/1.9 |
| 2012/0229834 A1* | 9/2012 | Nishikawa | ......... | G06K 15/1822 358/1.13 |

* cited by examiner

PARALLEL RENDERING OF REGION-BASED GRAPHICS REPRESENTATIONS

REFERENCE TO RELATED PATENT APPLICATION(S)

This application claims the benefit under 35 U.S.C. §119 of the filing date of Australian Patent Application No. 2013273768, filed 20 Dec. 2013, hereby incorporated by reference in its entirety as if fully set forth herein.

TECHNICAL FIELD

The present invention relates generally to the field of graphics rendering and, in particular, to a method, apparatus and system for rendering a region-based graphics representation. The present invention also relates to a computer program product including a computer readable medium having recorded thereon a computer program for rendering a region-based graphics representation.

BACKGROUND

The trend of achieving performance speedup through the use of multi-core and multi-processor architectures in computer systems, including printing systems, has gained widespread use in recent years. Multi-core and multi-processor architectures allow a number of computation threads belonging to one or more processes to execute in parallel across a number of cores or processors, thereby reducing the overall execution time.

One such multi-core architecture is a graphics processing unit (GPU). GPUs are commonly used to accelerate the rendering of 3D graphics for viewing on a display device. However, in recent years, GPU manufacturers have enabled the general-purpose programming of their GPUs. This concept is commonly known as general-purpose GPU (GPGPU). GPUs and other types of architectures, such as single-instruction multiple-data (SIMD) units and field programmable gate arrays (FPGAs), are also known as stream processors.

Modern GPUs typically contain hundreds of simple processing cores, also known as processing elements. They are therefore suited to applications and algorithms that can be executed with a large degree of parallelism, requiring little or no communication among parallel threads and minimal branching within a thread's instruction stream. Extracting such a large degree of parallelism from applications originally designed for sequential execution is often difficult, but the potential benefits of GPU processing can be large.

Print data is often pre-processed to form some kind of region-based intermediate representation. This may be done to compress the print data and use less memory, to transfer the print data across a network, or to enable printing in real time, for example. Due to the nature of region-based intermediate representations, it is often difficult to process them with many parallel threads, including on GPU architectures.

The main difficulty is that the intermediate representation must be processed in a sequential fashion. Some prior art methods store the intermediate representation as a sequence of rasterised non-overlapping edges, grouped into tiles (also referred to as fillmaps) of the page. For each tile, the edges are typically sorted by their start coordinate, first by start y coordinate and then by start x coordinate. For each edge, the x-coordinates of the edge's crossings with successive scan lines are stored in a sequence. To reduce memory usage, each x-coordinate is typically stored as a difference between the x-coordinate and the previous x-coordinate (an encoding method known in the art as "delta encoding"). To render an individual portion of a tile using such a representation, all edges must be searched sequentially, the delta-encoded x-coordinates decoded, and the x-coordinates sorted along each scan line to identify which edge activates the pixels in the portion being rendered. This process, repeated for every portion of the tile, entails a large amount of redundant processing (similar steps are repeated for every portion) and is therefore very inefficient. For this reason, such a representation is suitable for processing sequentially, but is not suitable for processing in parallel.

Other prior art methods store the representation as a sequence of bits, each bit corresponding to a pixel of the page. Typically, an "on" bit represents the transition from one object to the next along the corresponding scan line and between successive scan lines. To render any given object or pixel, all bits of the representation up to the given object or pixel must be processed. It is therefore inefficient to render individual objects or pixels of the page in parallel using such a representation.

Other prior art methods store the representation as a sequence of non-overlapping regions bounded by vector-based edges. Each region is typically stored independently, with its bounding edges and other rendering information such as colour. This region-independence allows individual regions to be rendered in parallel, possibly using existing GPU-based pipelines such as OpenGL. However, when rendering regions in parallel, the number of processors that can be utilised simultaneously is limited to the number of regions. This limitation means that GPUs, which typically contain hundreds of processing cores, will not be fully utilised. Another approach to rendering such a representation in parallel is to render individual portions of the image in parallel. To render an individual portion, the regions must be searched and their edges evaluated to determine if a region contains the portion. As with other representations, rendering individual portions using this representation entails a large amount of redundant processing (similar steps are repeated for every portion), and is therefore not suitable for parallel execution.

SUMMARY

It is an object of the present invention to substantially overcome, or at least ameliorate, one or more disadvantages of existing arrangements.

Disclosed are arrangements, referred to as Pixel Based Parallel Processing (PBPP) arrangements, which seek to address the above problems by processing region based intermediate representations of images to be rendered to a form which enables individual pixels, or groups of pixels of the image, to be individually addressable by respective computation threads, in a manner which produces edge related information for rendering the pixels without needing to perform extensive scan line sequential processing.

According to a first aspect of the present disclosure, there is provided a method of rendering an image using a plurality of threads, each thread from the plurality of threads being assigned to concurrently render a portion of the image, the method comprising the steps of:

receiving edge data corresponding to the image to be rendered, the edge data comprising a plurality of edges identified by edge indices, each edge having associated edge scan line crossing coordinates;

arranging the edge scan line crossing coordinates associated with the edges into a plurality of partitions indexed by the edge indices to form an indexing data structure that is randomly accessible by means of a coordinate of a portion of the image; wherein each partition in the indexing data structure comprises a list of said edge scan line crossing coordinates associated with an edge that is identified by the edge index indexing the partition; and rendering the portions of the image concurrently, each portion being rendered by a corresponding assigned thread by identifying, by randomly accessing a partition in the indexing data structure using a coordinate of said portion in the image, at least one edge in the indexing data structure associated with said portion of the image.

According to a second aspect of the present disclosure, there is provided a method of rendering an image using a plurality of threads, each thread from the plurality of threads being assigned to concurrently render a portion of the image, the method comprising the steps of:

receiving edge data corresponding to the image to be rendered, the edge data comprising a plurality of edges identified by edge indices, each edge having associated edge scan line crossing coordinates;

determining a sequence of edge reference values associated with at least one edge index, each edge reference value in the sequence of edge reference values corresponding to a portion of the image associated with an edge index;

determining an edge index associated with a portion by randomly accessing the sequence of edge reference values by means of a coordinate of the portion in the image; and rendering the portions of the image concurrently, each portion being rendered by an assigned thread using the edge associated with a corresponding determined edge index.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which:

FIG. 19A is an example of an edge index mapping matrix corresponding to the fillmap tile shown in FIG. 17A according to the disclosed PBPP arrangements;

FIG. 19B is an example of determining a mapping from pixel coordinates to edge indices using an edge index mapping matrix only, for the edge index mapping matrix shown in FIG. 19A according to the disclosed PBPP arrangements;

DETAILED DESCRIPTION INCLUDING BEST MODE

Figure 1:
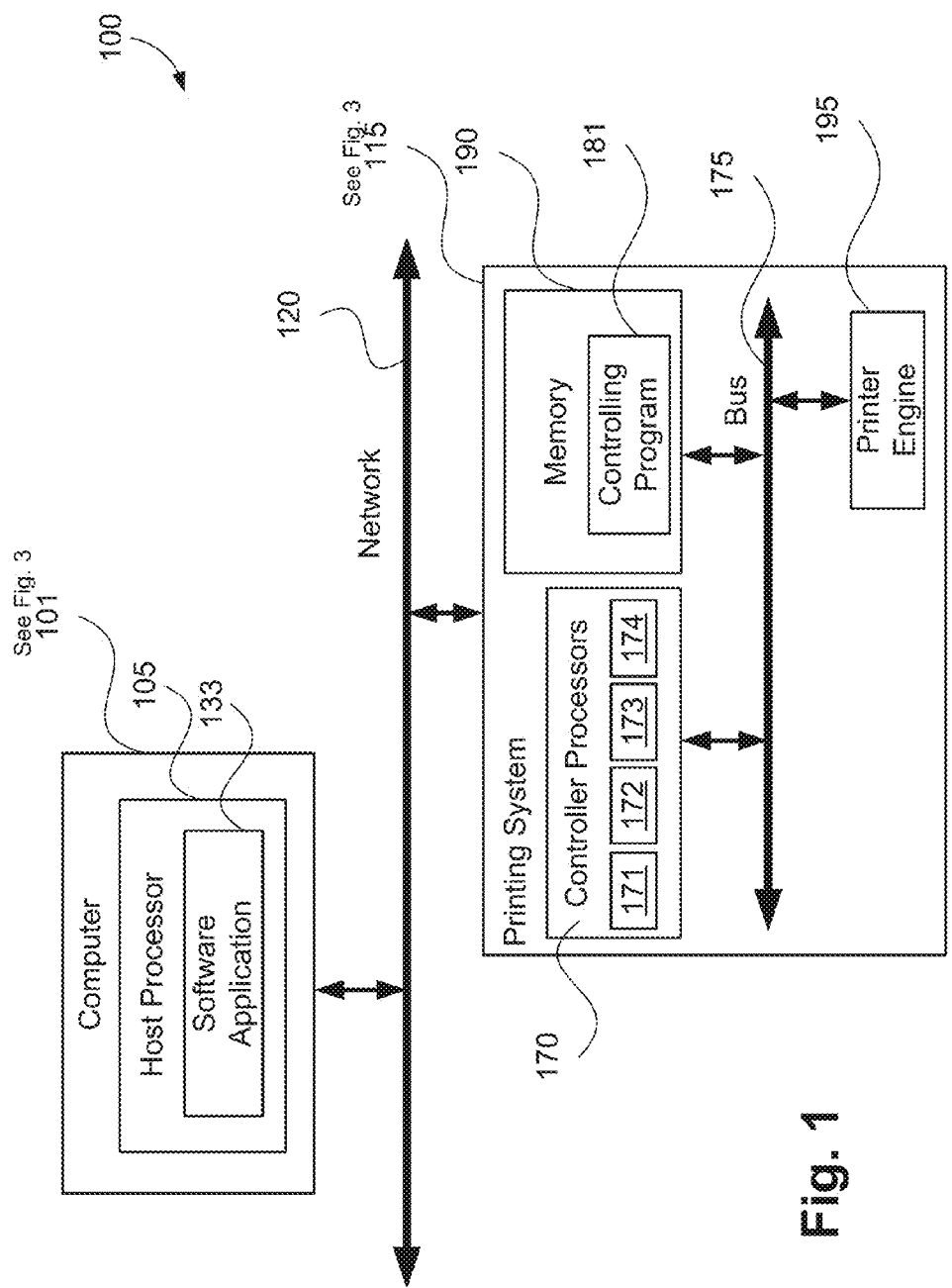
FIG. 1 is a schematic block diagram of a multi-processor printing system for rendering the graphic objects of a page according to the disclosed PBPP arrangements.

Where reference is made in any one or more of the accompanying drawings to steps and/or features, which have the same reference numerals, those steps and/or features have for the purposes of this description the same function (s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The disclosed PBPP arrangements ameliorate the problems of the prior art. PBPP methods are described for producing representations that can be accessed randomly and independently by many parallel threads. PBPP methods are also described for rendering portions of an image in parallel based on said representations. Such methods can be applied to many multi-processor architectures (e.g., multi-core or many-core), the preferred architecture being a GPU. The disclosed PBPP arrangements address problems inherent in the application of GPU processing to print data and graphics data in general.

Context

FIG. 1 shows a schematic block diagram of a pixel rendering system 100 for rendering graphic objects. The pixel rendering system 100 comprises a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices, such as a USB, serial, parallel or FireWire cable.

The computer module 101 comprises at least one host processor 105 for executing a software application 133, such as a word processor or graphical software application.

The printing system 115 comprises plurality of controller processors 170. As shown in FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above. In a preferred implementation of the disclosed PBPP arrangements, one of the processors 171-174 is a GPU processor.

The printing system 115 also has a printer engine 195 coupled to the controller processors 170, via an interconnected bus 175. The controlling program 181 accepts a printable page 201 produced by a software application 133 and produces pixel data values 206 for printing. The pixel data values 206 may then be stored in memory 190 and reproduced as pixels by the printer engine 195, for example. The controlling program 181 may be executed by the controller processors 170 in one or more threads of execution. A thread consists of a number of instructions or steps that are executed in sequence by one of the processors 171-174. The controlling program 181 will be further described in detail below with reference to FIG. 2.

Figure 3A:
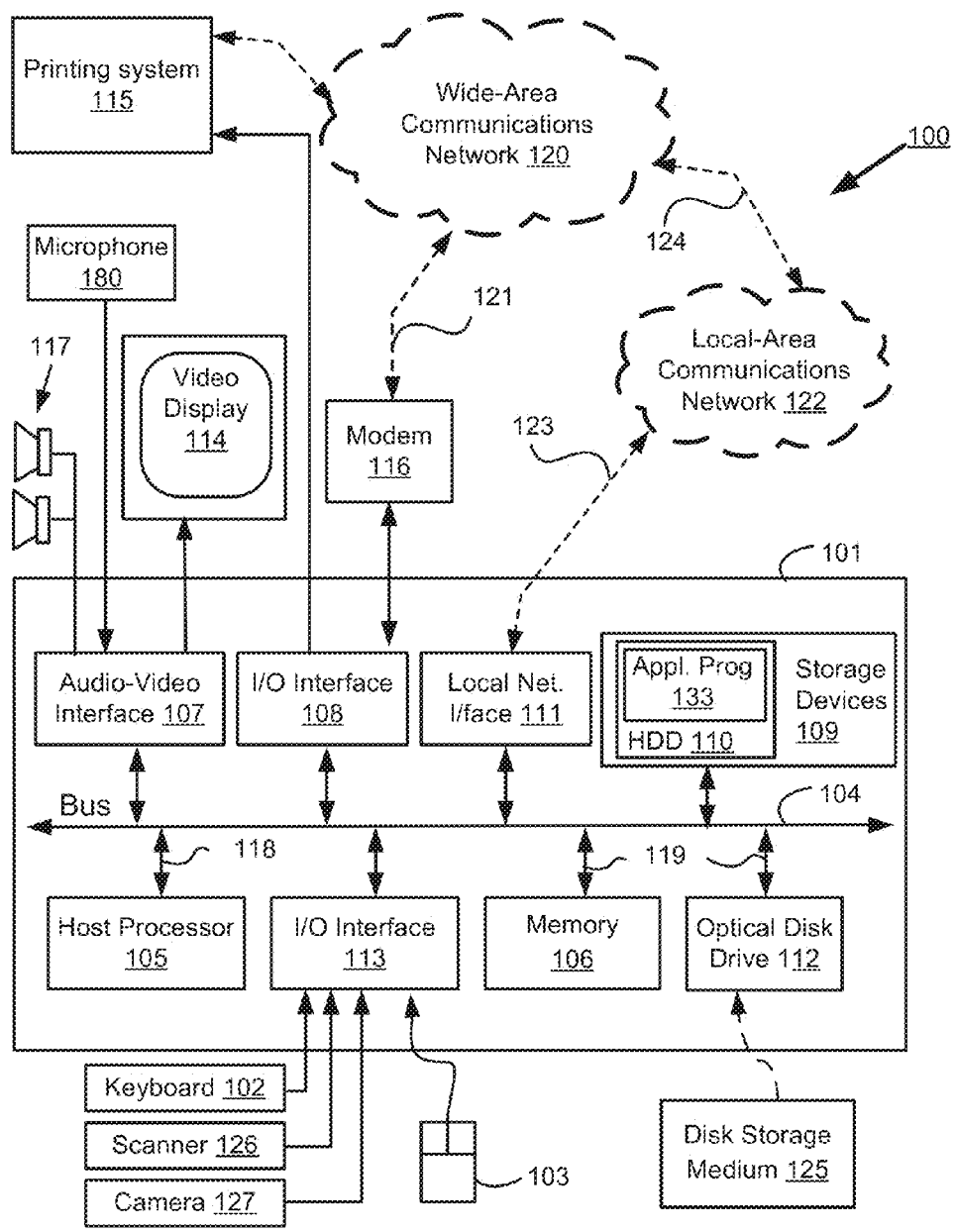
FIGS. 3A and 3B collectively form a schematic block diagram of a general purpose computer system upon which PBPP arrangements described can be practiced in more detail.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac or alike computer systems.

Methods described below may be implemented using the system 100 wherein one or more steps of the processes of FIGS. 2, 4 and 6-20, to be described, may be implemented as one or more code modules of the software application program 133 executable within the system 100. One or more of the steps of the described methods may be effected by instructions 131 (see FIG. 3B) in the software 133 that are carried out within the system 100. The invention, as defined by the processes of FIGS. 2, 4 and 6-20, is preferably performed by the processors 170, of which one is preferably a GPU processor 301, but can alternatively or partially be performed by the host processor 105.

As also described below, one or more steps of the processes of FIGS. 2, 4 and 6-20, to be described, may be implemented as one or more of the code modules forming the controlling program 181 executable within the printing system 115. Again, one or more of the steps of the described methods may be effected by instructions, similar to the instructions 131 in the software 133.

The software instructions implementing the software application program and/or the controlling program may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 and/or the controlling program 181 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the software application program and/or the controlling program and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
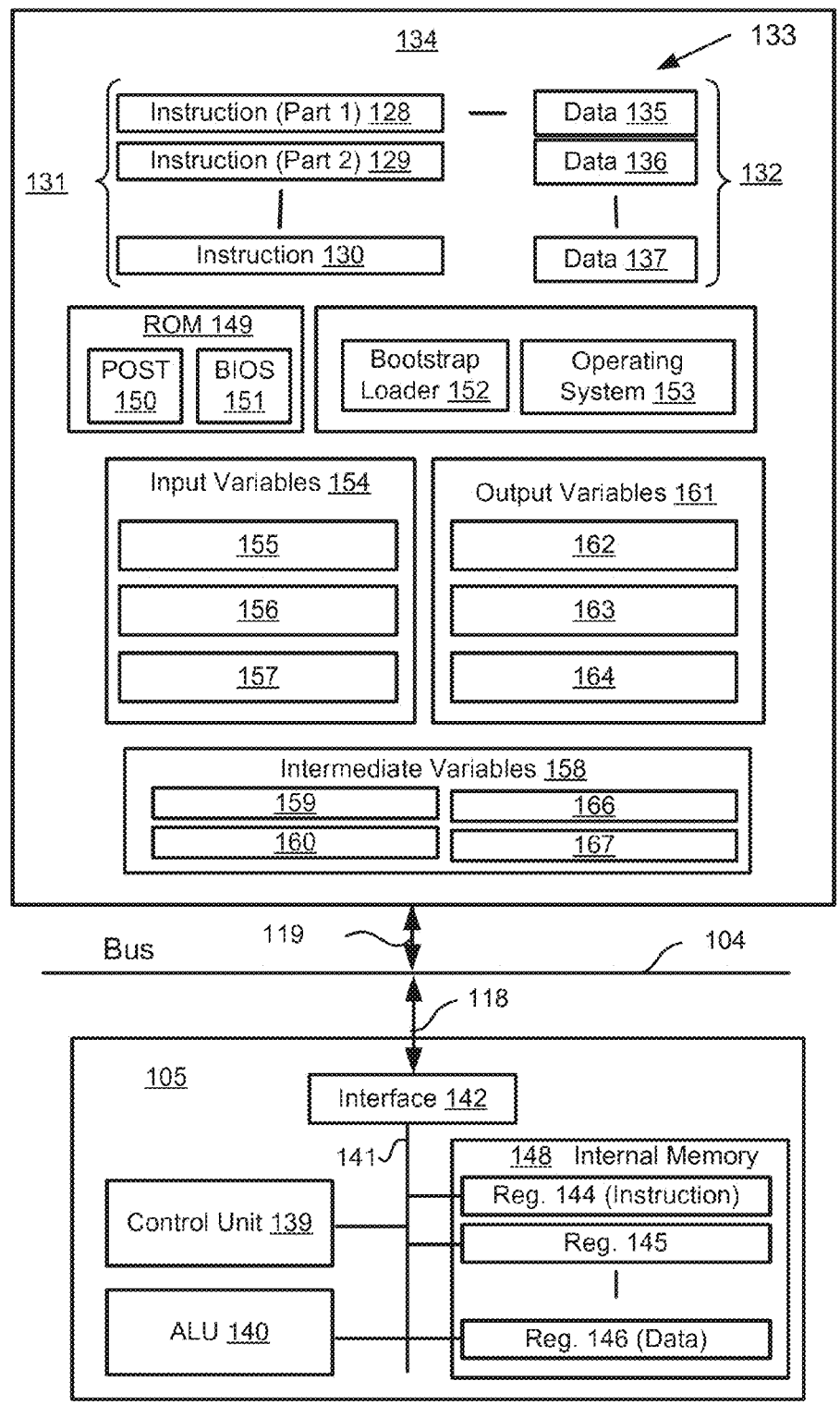

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;
(b) a decode operation in which the control unit 139 determines which instruction has been fetched; and
(c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2, 4 and 6-20 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2, 4 and 6-20, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
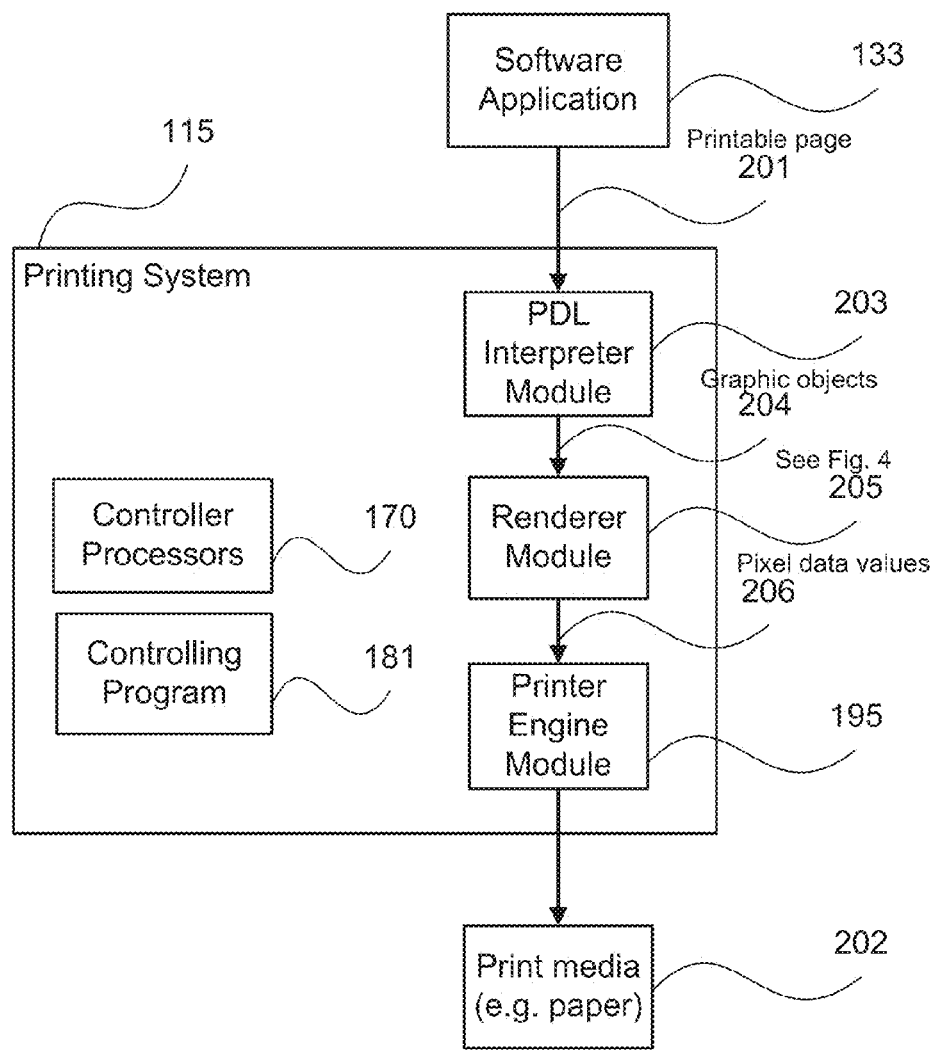
FIG. 2 is an example of a software architecture for the printing system of FIG. 1.

FIG. 2 shows a software architecture for printing a printable page 201 using the computer system 100. Each of the modules 203 and 205 described below may be formed by one or more of the code modules of the controlling program 181 and/or the software application 133.

The software application 133, for example, executing on the computer module 101, provides the printable page 201 to the printing system 115 for printing to a print media 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of graphic objects to be rendered onto the print media 202 in a rendering (or z) order, as opposed to a raster image (i.e. a bitmap of pixel values) of the page to be printed. The printable page 201 may be the whole or part of a print job created by the software application 133 executing in the computer module 101.

A PDL interpreter module 203 receives the printable page 201 and generates graphic objects 204 to be printed. The printing system 115 then uses a renderer module 205 to render the graphic objects 204 to pixel data values 206. The pixel data values 206 are printed to the print media 202, such as paper, using a printer engine module 195. The printer engine module 195 may, for example, be an electro-photographic engine.

The PDL interpreter module 203 and renderer module 205 may be implemented as one or more code modules of the controlling program 181 which is executed by the controller processors 170 within the printing system 115. The renderer module 205 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Figure 3C:
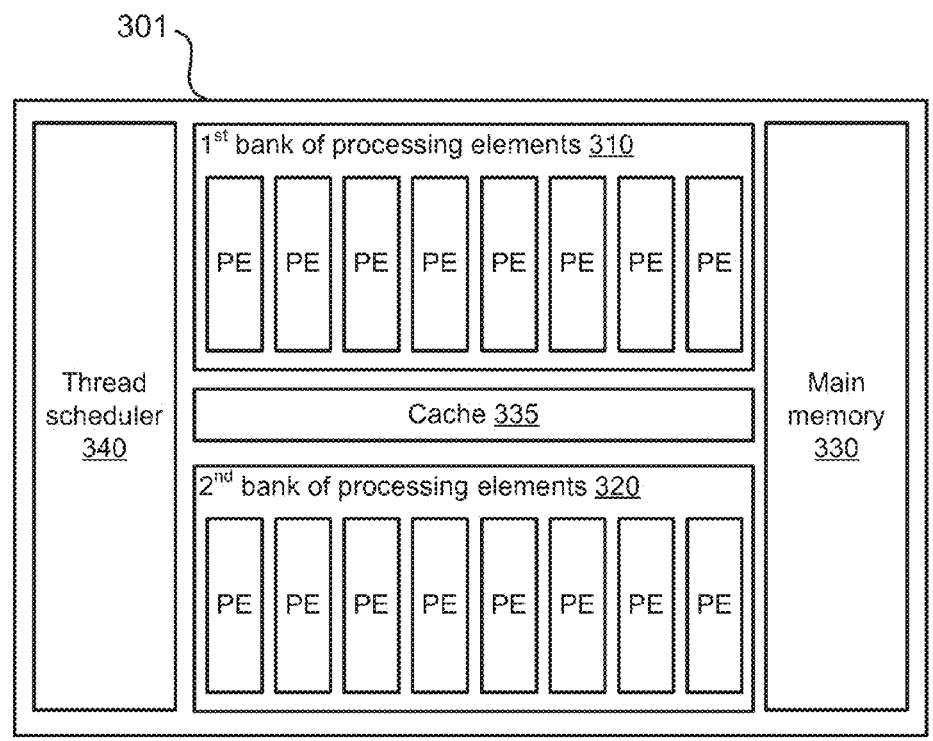
FIG. 3C is a schematic block diagram of a typical GPU processor that can be used in the disclosed PBPP arrangements.

As described earlier, the controller processors 170 can take many different forms, including single-core CPUs and GPUs. A schematic block diagram of a CPU was described previously with reference to FIG. 3B. A schematic block diagram of a GPU will now be described with reference to FIG. 3C. The main component of a GPU is its many processing elements. The example GPU 301 contains two banks of processing elements 310 and 320. Each processing element is capable of executing many threads of execution in parallel using one or more SIMD (single instruction multiple data) arrays. A processing element may also contain a small amount of fast cache memory and a scheduler for deciding which threads to execute at any given point in time. A higher-level thread scheduler 340 allocates blocks of threads to individual processing elements. Another level of cache memory 335 is typically provided between the processing elements 310 and 320, and main memory 330. Main memory 330 may be a subset of the printing system's memory 190, or may be entirely separate memory that is considered part of the GPU. Main memory 330 is typically large and slow to access. Many variations in GPU architecture exist, but most architectures share the general components shown in FIG. 3C.

Returning to FIG. 1, in the pixel rendering system 100, the software application 133 creates printable pages for printing, such as printable page 201. The printable page 201 often contains graphic objects such as text, lines, fill regions, and image data. The software application 133 sends a high-level description of the printable page 201 (e.g., a PDL file) via the network 120 to the controlling program 181 that is executed by the controller processors 170 of the printing system 115. The printable page 201 contains all information required by the printing system 115 to render and print the page.

In alternative arrangements, the printing system 115, the controller processors 170 and controlling program 181, may be resident in separate servers connected to the network 120, such as the computer system 101. In still another alternative arrangement, the printing system 115, the controller processors 170 and controlling program 181 may be resident in a distributed network of servers. In such systems, the raster image representation produced by the controlling program 181 is sent to the printer engine module 195 via a network rather than the bus 175.

The described PBPP methods may also be implemented as part of other graphics rendering systems in which an intermediate representation is rendered (e.g. for displaying PDF documents on an LCD display). As such, the described PBPP methods are not limited to printing systems.

Figure 4:
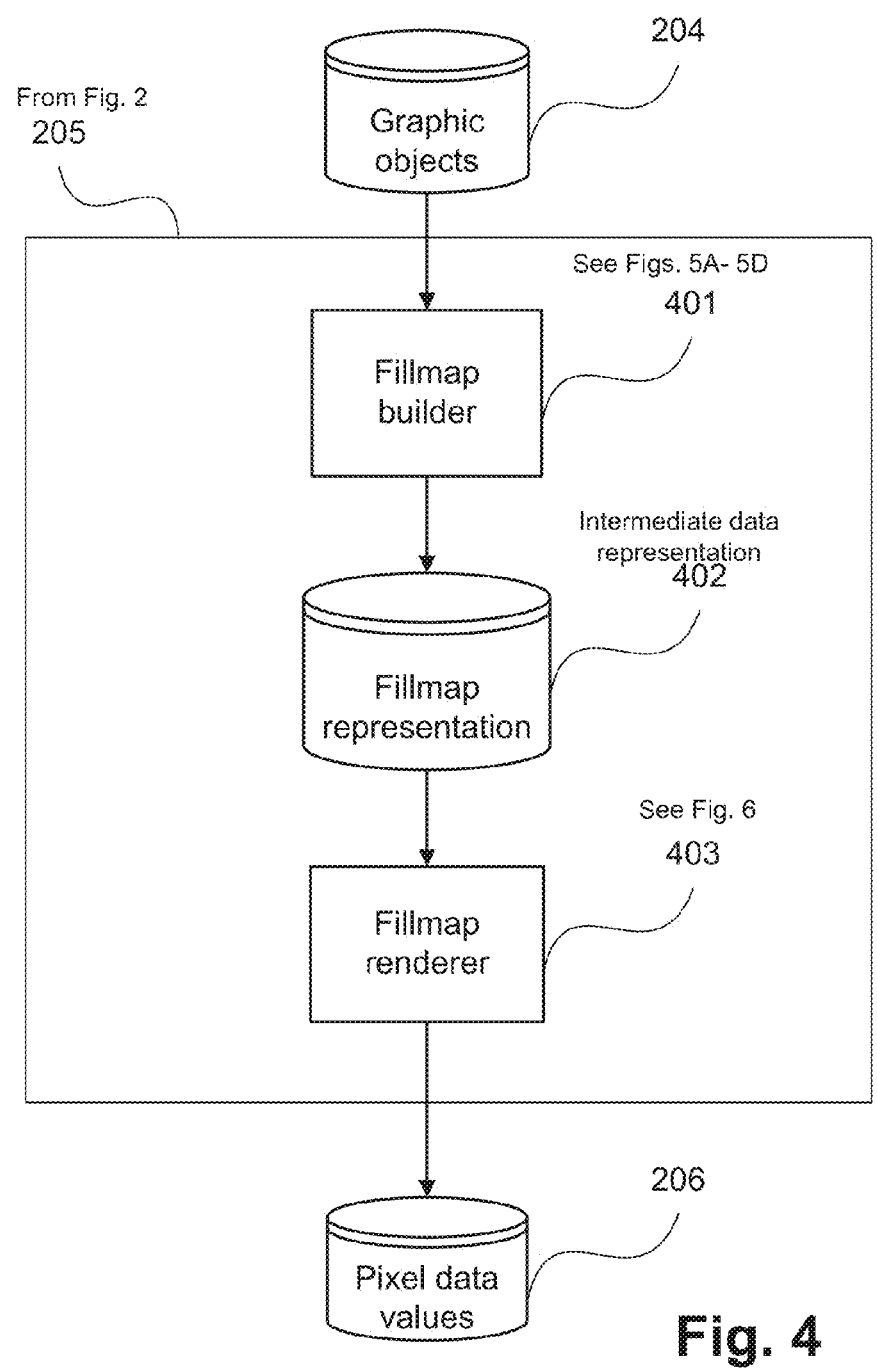
FIG. 4 is a schematic block diagram of a renderer module that can be used in the disclosed PBPP arrangements.

The renderer module 205 will now be described in more detail with reference to FIG. 4. The renderer module 205 contains or otherwise implements a preferred implementation of rendering graphic objects 204 to pixel data values 206 according to the disclosed PBPP arrangements.

As described earlier with reference to FIG. 2, the renderer module 205 receives graphic objects 204. The fillmap builder 401 receives the graphic objects 204 in an order known in the art as z-order. The fillmap builder 401 converts the graphic objects 204 into an intermediate representation. In the preferred PBPP implementation, the intermediate print data representation is the fillmap representation 402, which is a rasterised region-based representation. The fillmap builder process executed by the fillmap builder 401 will be described in more detail later with reference to FIGS. 5A-5D.

The fillmap renderer 403 receives the fillmap representation 402 and renders the fillmap representation 204 to pixel data values 206. The rendering process executed by the fillmap renderer 403 will be described in more detail later with reference to FIG. 6.

As described earlier with reference to FIG. 2, the controlling program 140, and therefore the renderer component 205, is executed by the controller processors 170. The fillmap builder 401 and fillmap renderer 403 may therefore utilise multi-threading techniques known in the art to reduce the time spent processing the graphic objects 204.

A fillmap representation of a graphical image such as a page will now be described in more detail. A fillmap is a region-based representation of a page. The fillmap maps a region of pixels within the page to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:

a) are monotonically increasing in the y-direction of the page;
     (ii) do not intersect with each other;
     (iii) are aligned with pixel boundaries, meaning that each pixel-aligned fillmap edge consists of a sequence of segments, each of which follows a boundary between two contiguous pixels;
     (iv) contain a reference to the fill sequence required to be composited to render to pixels the fillmap region to which the pixel-aligned fillmap edge belongs; and
     (v) activate pixels within a single fillmap region.

In one preferred PBPP arrangement, references to fill compositing sequences are indices into a table of fill compositing sequences.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in the table of fill compositing sequences. A fill compositing sequence is a sequence of z-ordered levels, where each level contains attributes such as a fill, the opacity of the level, a compositing operator which determines how to mix the colour data of this level with other overlapping levels, and the priority, or z-order, of the level. A fill compositing sequence contains references to all the levels which contribute colour to the pixels within a fillmap region. The table of fill compositing sequences contains all of the fill compositing sequences required to render the page to pixels. The table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

Figure 5A:
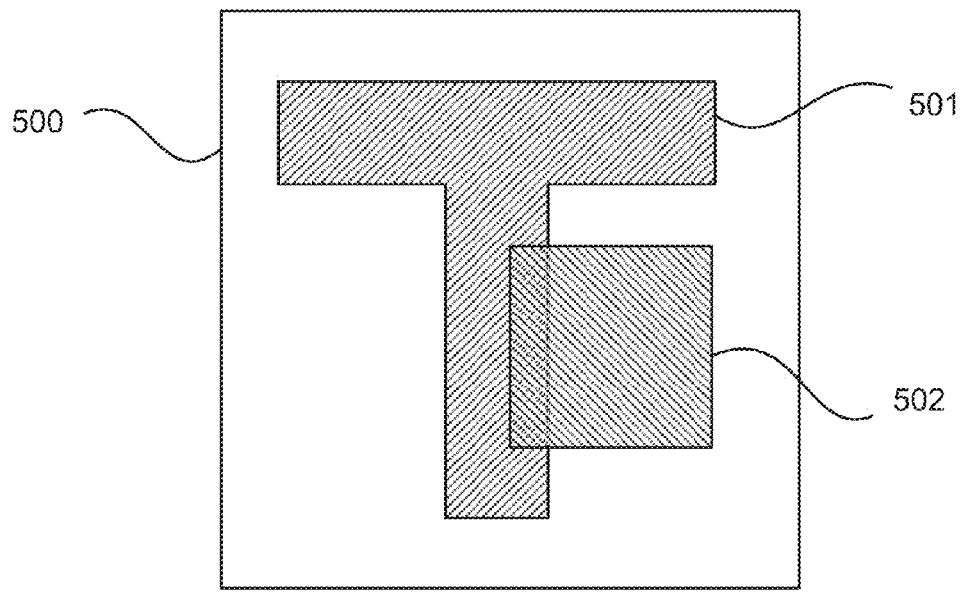
FIG. 5A shows an exemplary page with graphic objects.

The generation of a fillmap representation of a page will now be described with reference to FIG. 5A to FIG. 5D. FIG. 5A shows a page representation 500. The page 500 has a white background and said page contains two graphic objects 501 and 502. The first graphic object 501 is an opaque "T" shaped object with a right-leaning hatched fill. The second graphic object 502 is a transparent square with a left-leaning hatched fill. Examples of other fills are blends representing a linearly varying colour, bitmap images or tiled (i.e. repeated) images. The second graphic object 502 partially overlaps the first graphic object 501.

Figure 5B:
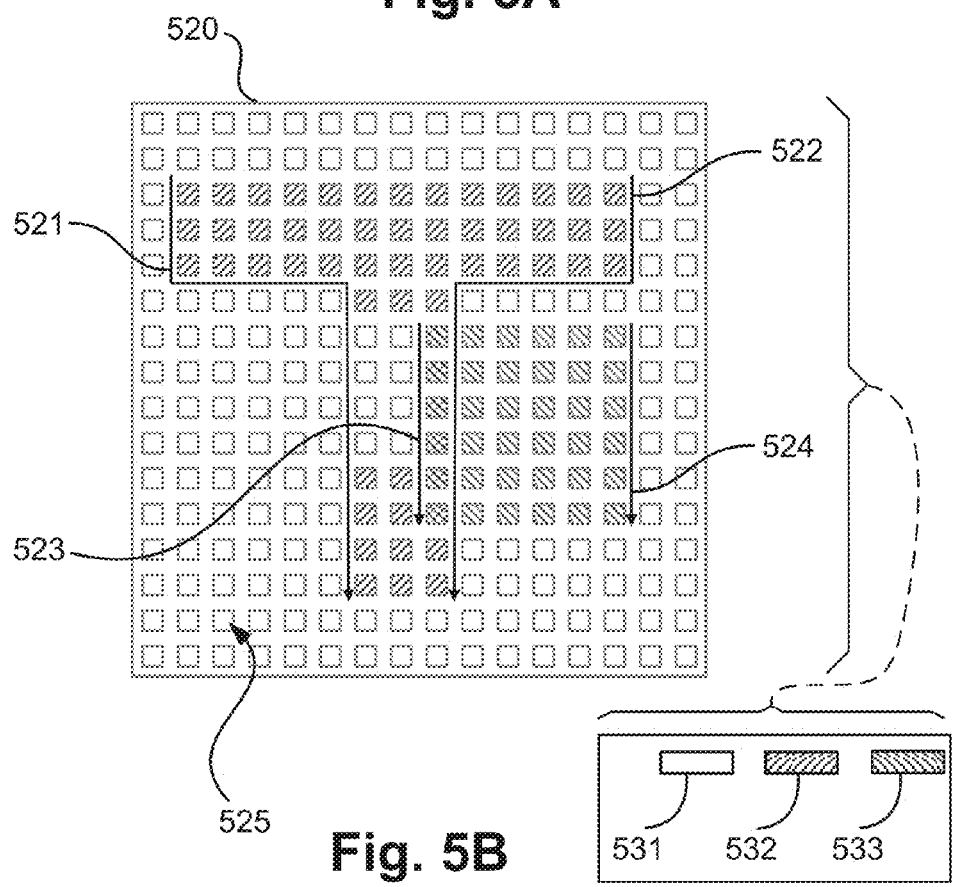
FIG. 5B shows the pixel-aligned object edges, and their associated fills, of the page of FIG. 5A.

FIG. 5B shows the decomposition of the graphic objects 501 and 502 of the page 500 into pixel-aligned graphic object edges, levels and fills according to a pixel grid 520. A graphic object is decomposed into two or more pixel-aligned object edges, a single level, and one or more fills. Pixel-aligned graphic object edges define the activation or deactivation of a level during rasterisation. Pixel-aligned graphic object edges therefore refer to the level of the object from which they are derived. The first graphic object 501 is decomposed into two pixel-aligned graphic object edges 521 and 522, and a level 532 that consists of a right-leaning hatched fill. Pixel-aligned graphic object edges 521 and 522 refer to the level 532 of the first graphic object 501. The second graphic object 502 is decomposed into two pixel-aligned graphic object edges 523 and 524, and a level 533 that consists of a transparent left-leaning hatched fill. Pixel-aligned graphic object edges 523 and 524 refer to the level 533 of the second graphic object 502. The background 525 has a level 531 that consists of white fill.

Figure 5C:
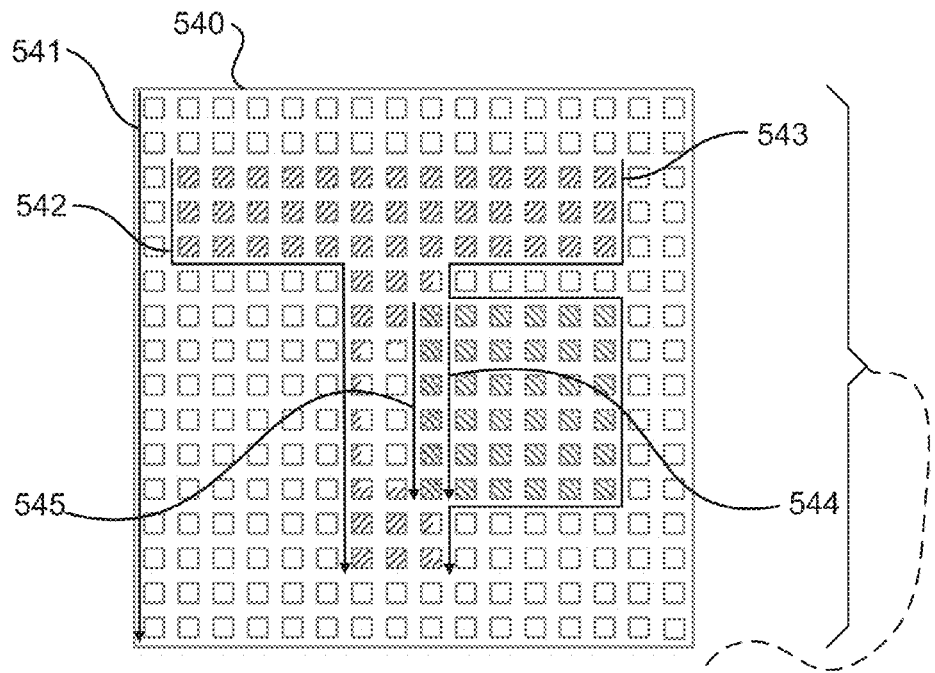
FIG. 5C shows a fillmap representation of the page of FIG. 5A.
Figure 5C:
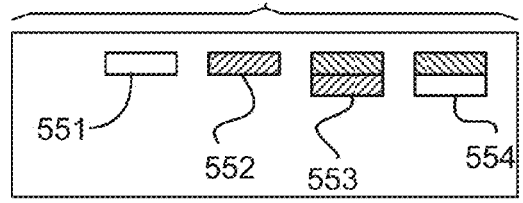

FIG. 5C shows a fillmap representation 540 of the page 500 represented in FIG. 5A. The fillmap representation 540 is composed of five pixel-aligned fillmap edges, hereafter known simply as edges or fillmap edges. Each edge references a fill compositing sequence which will be used to determine the colour of each of the pixels activated by that edge. On any given scan line on which an edge is active, the edge will activate those pixels which are immediately to the right of the edge, until the next edge or a page boundary is encountered. The first edge 541 traces the left hand boundary of the page, and references a fill compositing sequence 551 which contains a single opaque level which is to be filled using the background fill. The second edge 542 traces the left hand boundary of the first graphic object 501, and references a fill compositing sequence 552 that contains a single level which is opaque and is to be filled using a right-leaning hatched fill. The third edge 543 references the same fill compositing sequence 551 as the first edge 541. The fourth edge 544 traces the left hand boundary of the region where the second object 502 overlaps the white background. The fourth edge 544 references a fill compositing sequence 554 which contains two levels. The top most level is transparent and is to be filled using a left-leaning hatched fill. The bottom most level is opaque and is to be filled using the background fill. The fifth edge 545 traces the left hand boundary of the region where the second graphic object 502 overlaps the first graphic object 501. The fifth edge 545 references a fill compositing sequence 553 which contains two levels. The top most level is transparent and is to be filled using a left-leaning hatched fill. The bottom most level is opaque and is to be filled using a right-leaning hatched fill.

Accompanying the fillmap representation 540 of the page is a table of fill compositing sequences which contains the fill compositing sequences 551, 552, 553 and 554 referenced by the edges contained in the fillmap representation 540 of the page.

Figure 5D:
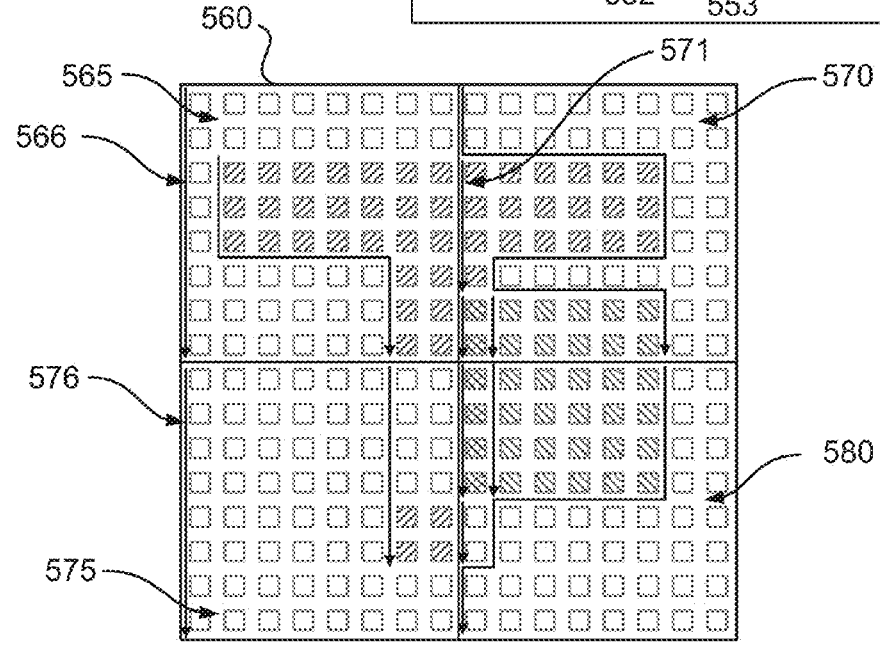
FIG. 5D shows a tiled fillmap representation of the page of FIG. 5A.

FIG. 5D shows a tiled fillmap representation 560 of the page represented in FIG. 5A. The tiled fillmap contains four tiles 565, 570, 575 and 580. Each tile has a height and width of eight pixels. In order to generate the tiled fillmap representation 560 of the page, the edges of the original fillmap representation 540 have been split across fillmap tile boundaries. For example, the edge 541 which traces the left hand boundary of the page in the untitled fillmap representation 540 shown in FIG. 5C has been divided into two edges 566 and 576. The first edge 566 activates pixels in the top-left hand tile 565, while the second edge 576 activates pixels in the bottom-left hand tile 575. Also, new edges have been inserted on the tile boundaries to activate the left most pixels of each tile which were previously activated by an edge in a tile to the left of the tile in which the pixels reside. For example, in the top-right tile 570 a new edge 571 has been inserted to activate pixels which were activated by the edge 542 which traces the left hand boundary of the first graphic object 501 in the original fillmap representation 540 shown in FIG. 5C.

In the preferred implementation, the fillmap representation and tiled fillmap representation stores edges in order of increasing start coordinate. More specifically, edges are sorted first by start y-value, then edges with equal start y-value are sorted by start x-value. The start coordinate of an edge is the coordinate of the first pixel in the fillmap or fillmap tile that the edge activates, when pixels are traversed in scan line order and from left to right. For example, the start coordinate of edge 542 shown in FIG. 5C is (x=1, y=2), if the coordinate of the top-left pixel is (x=0, y=0). This edge 542 has a start x-value of 1, and a start y-value of 2. For example, with reference to the fillmap representation 560, edges will be stored in the order 541, 542, 543, 545, 544. In the preferred implementation, the remaining coordinates of the first pixel on each scan line activated by an edge are stored as a sequence of x-values with successive y-values beginning at the start y-value. Preferably, the sequence of x-values is further encoded using a method known in the art as "delta encoding". That is, each x-value is stored as the difference between the x-value and the previous x-value in the sequence of x-values of the corresponding edge. An example of storing the edges of the fillmap representation will be described later with reference to FIG. 17. In a tiled fillmap representation, a separate list of edges is kept for each tile.

Overview of the Disclosed PBPP Arrangements

The disclosed PBPP arrangements address the problem of efficiently rendering region-based intermediate representations using processors containing many cores, such as GPUs. An indexing data structure is created based on the edge data extracted from an intermediate representation. The indexing data structure provides a fast way for independent threads of execution to determine the edge(s) associated with a portion of the image being rendered. Once the edge(s) associated with a portion is known, the colour(s) to use to render the portion can easily be determined. This solution enables highly parallel rendering with GPUs.

Figure 6:
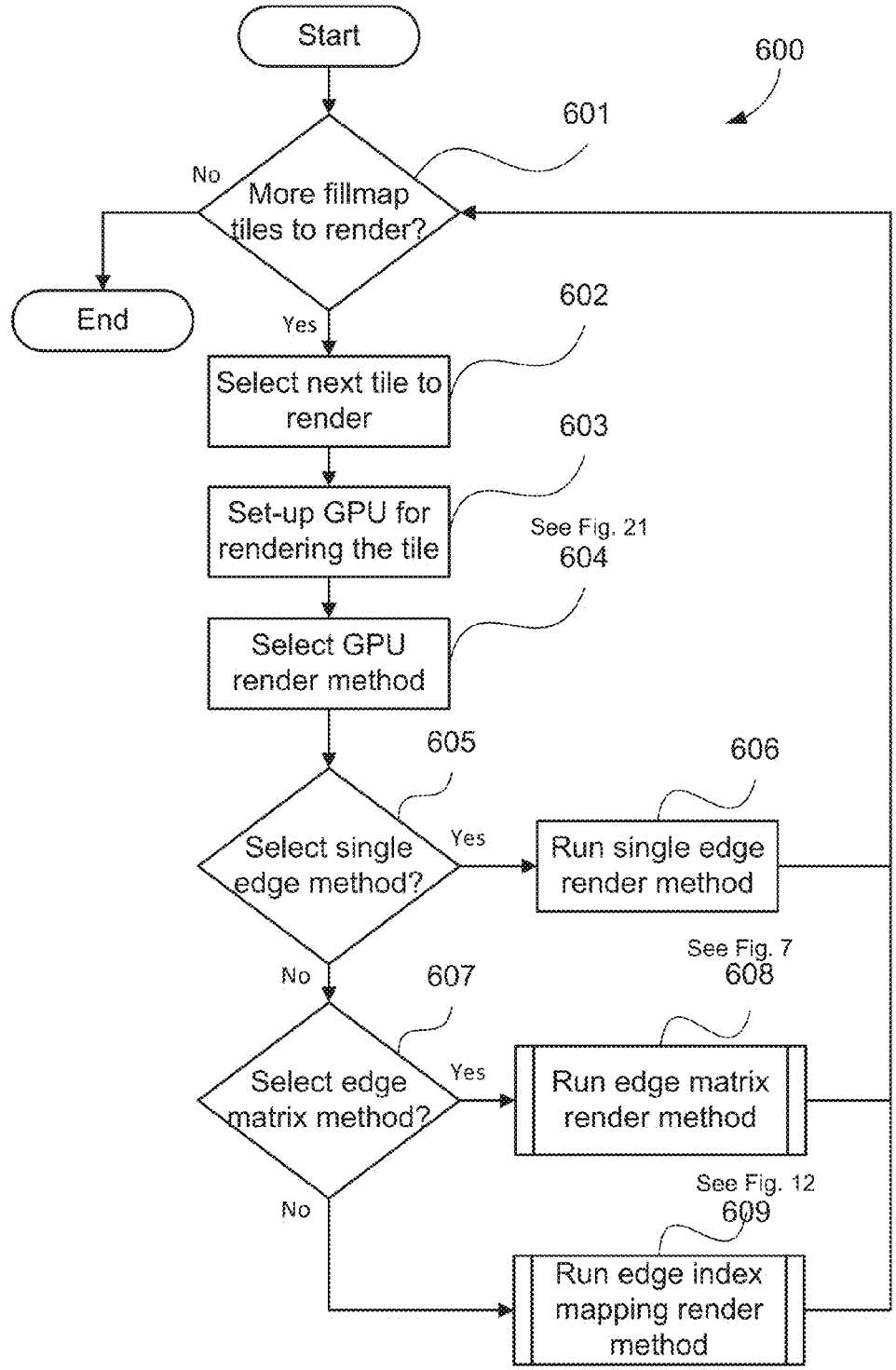
FIG. 6 is a schematic flow diagram illustrating a method of rendering a tiled fillmap representation as used in a fillmap renderer in the disclosed PBPP arrangements.

The process 600 of rendering a fillmap representation 402 according to the fillmap renderer 403 will now be described with reference to FIG. 6. In the preferred PBPP arrangement, process 600 is executed using a combination of CPU and GPU controller processors 170, directed by the controlling program 181. The following description describes the rendering of a tiled fillmap representation, such as the example tiled fillmap 560 described previously with reference for FIG. 5D. Other disclosed PBPP arrangements may be used to render a non-tiled fillmap representation, such as the example fillmap 540 described previously with reference for FIG. 5C. It should also be noted that the disclosed PBPP arrangements can be used to render intermediate representations other than the fillmap representation.

Process 600 starts and proceeds to a decision step 601 where it is decided if there are more tiles in the fillmap representation 402 left to render. If it is determined that there are more tiles to render, process 600 proceeds to a step 602, where the next tile to render is selected. Tiles may be rendered in any sequence, such as from top to bottom and left to right, or in parallel in any order.

Process 600 then proceeds to a set-up step 603, where a GPU controller processor 170 is set-up for executing one of the render methods for the tile. This step may include transferring to the GPU main memory 330 the fill compositing sequences referenced by edges in the tile, the bitmap images and colour information referenced by the fill compositing sequences, and allocating the output buffer in the GPU main memory 330 for storing the rendered image for the tile.

Process 600 then proceeds to a selection step 604 where the render method is selected. Different render methods may be suitable for different fillmap tiles depending upon attributes of the fillmap tiles. For example, one render method may be fastest at rendering tiles with a small number of edges, while another may be more suitable for rendering tiles with a large number of edges. Other factors besides the number of edges, such as the density of edges and the complexity of the fill compositing sequences associated with the edges, may also be used to select a render method. An example of selecting between different render methods will be described later with reference to FIG. 21.

Process 600 then proceeds to a decision step 605, where it is determined if a render method suitable for rendering a tile containing a single edge has been selected. If a tile contains a single edge, all pixels in the tile are to be rendered using the same fill compositing sequence. Therefore, a simple render method that renders all pixels in the same manner is optimal. If it is determined that a single edge render method is selected, processing proceeds to a render step 606, where such a render method is launched. The step 606 is preferably run on a GPU controller processor 170, using a thread per pixel. Each thread executes the same operations to retrieve the colour information and render the pixel to the output buffer in main memory 330. Upon completion of step 606, processing returns to the step 601.

If it is determined at the decision step 605 that a render method for rendering a single edge tile is not selected, processing proceeds to a decision step 607, where it is determined if a render method based on an edge matrix has been selected. If it is determined that an edge matrix render method is selected, processing proceeds to a step 608, where such a render method is launched. The step 608 will be described in more detail later with reference to FIG. 7. Upon completion of the step 608, processing returns to the step 601.

If it is determined at the decision step 607 that an edge matrix render method is not selected, processing proceeds to a step 609, where a render method based on an edge index mapping is launched. The step 609 will be described in more detail later with reference to FIG. 12. Upon completion of the step 609, processing returns to the step 601. If it is determined at the step 601 that there are no more fillmap tiles to render, the entire fillmap has been rendered to pixel data values 206 and the process 600 completes.

Once all tiles have been rendered in accordance with the process 600, the pixel data values 206 contains the complete rendered page. The pixel data values 206 may then be sent to the printer engine module 195 for printing to the print media 202.

PBPP Arrangement 1

Figure 7:
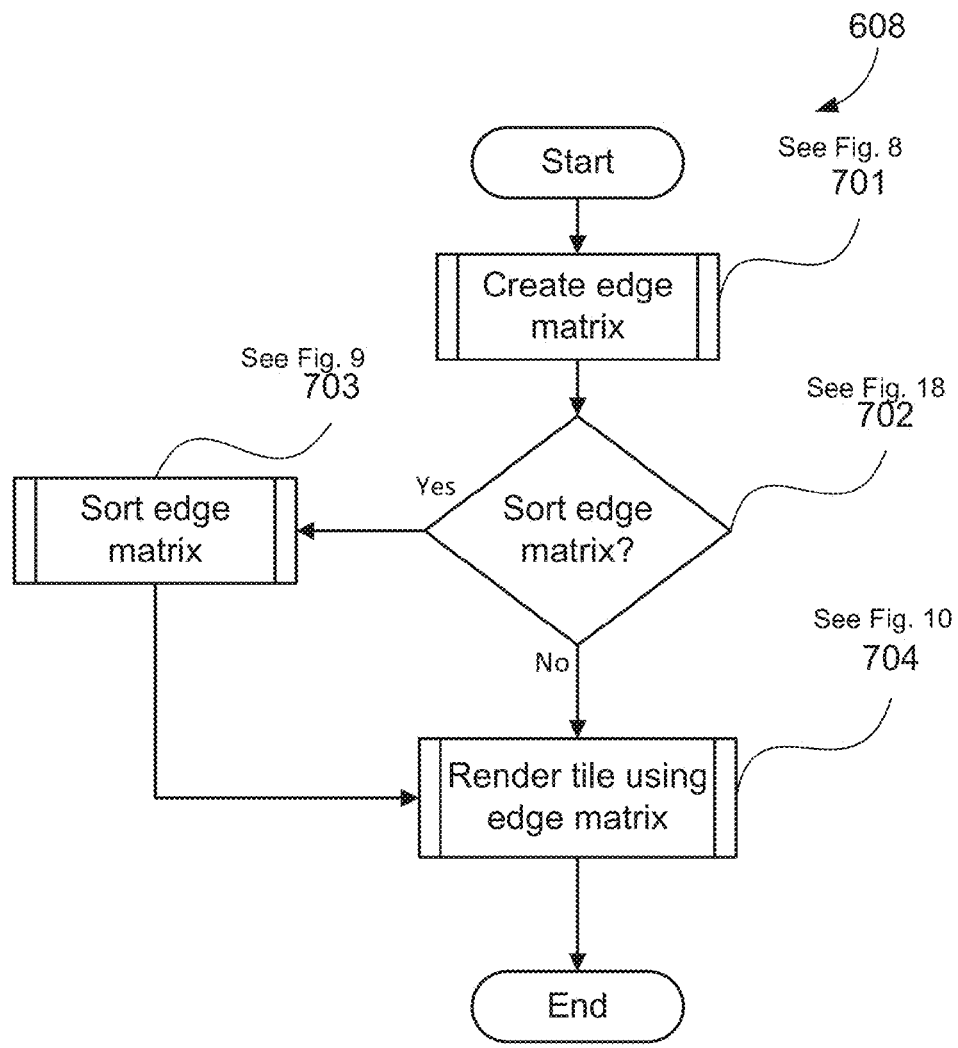
FIG. 7 is a schematic flow diagram illustrating a method of rendering a fillmap tile using an edge matrix as used in the method of FIG. 6 according to the disclosed PBPP arrangements.

The process 608 of rendering a tile using an edge matrix render method will now be described with reference to FIG. 7. In the preferred PBPP arrangement, the process 608 is executed using a combination of CPU and GPU controller processors 170, directed by the controlling program 181. The process 608 starts and proceeds to a step 701 where an edge matrix is created. The step 701 will be described in more detail later with reference to FIG. 8. The process 608 then proceeds to a decision step 702, where it is decided whether the edge matrix is to be sorted. This decision may be based on the number of edges in the tile, and the arrangement of the edges within the tile. For example, if there are many edges concentrated at a small number of scan lines, the time taken to sort the edge matrix may outweigh any benefits gained when rendering the tile using the edge matrix. The benefits associated with sorting the edge matrix will be described in more detail later with reference to the example in FIG. 18.

If it is determined at the step 702 that the edge matrix is to be sorted, processing proceeds to a sorting step 703, where the edge matrix created at the step 701 is sorted. The step 703 will be described in more detail later with reference to FIG. 9. Upon completion of the sorting step 703, processing proceeds to a rendering step 704, where the tile is rendered using the edge matrix created at the step 701 and sorted at the step 703. The step 704 will be described in more detail later with reference to FIG. 10.

If it is determined at the step 702 that the edge matrix is not to be sorted, processing proceeds to a rendering step 704, where the tile is rendered using the edge matrix created at the step 701. The process 608 ends upon completion of the rendering step 704.

The process 701 of creating an edge matrix will now be described with reference to FIG. 8. In the preferred PBPP arrangement, the process 701 is executed using a CPU (e.g., the processor 171 of the controller processors 170 may be a CPU), as directed by the controlling program 181. The process 701 starts and proceeds to a step 801 where the number of scan lines and the number of edges in the tile is determined. This information is preferably stored in and can be obtained from header information associated with the tile. Processing proceeds to a step 802 where an empty edge matrix is created. The number of rows in the edge matrix is equal to the number of scan lines in the tile being rendered. The number of columns in the edge matrix is equal to the number of edges in the tile. The remaining steps 803-807 serve to populate the edge matrix with edge information.

The process 701 proceeds to a decision step 803, where it is determined if there are more edges in the tile remaining to be processed. If it is determined that there are edges remaining to be processed, processing proceeds to a step 804, where the next edge is retrieved from the tile. As described previously with reference to FIG. 5, edges in a tile are preferably stored as a sequence of edges. Therefore, edges can simply be retrieved one after another from the list of edges. An example of a fillmap tile's sequence of edges is described later with reference to FIG. 17B.

Processing then proceeds to a step 805 where the coordinate of the start of the edge is determined. This start coordinate corresponds to the first pixel activated on the first scan line the edge intersects. This information can be found in the header information of the edge, as described previously with reference to FIG. 5 and shown in the example described later with reference to FIG. 17B. The process 701 then proceeds to a step 806 where the edge coordinates of the edge are determined. In the preferred PBPP arrangement, an edge stored in the fillmap representation comprises a sequence of delta-encoded x-values corresponding to the coordinates of the points of the intersection of the edge with the scan lines it intersects. The x-values are preferably sorted by increasing y-value. Edge coordinates are determined using the start coordinate and decoded x-values. The x-values are decoded by first initialising a current x-coordinate with the x-value of the start coordinate. The current y-coordinate is initialised with the y-value of the start coordinate. Then, the delta-encoded x-values are traversed. Each x-value in the delta-encoded x-values is summed with the current x-coordinate in turn, which produces the x-coordinate of the edge boundary on the next scan line. For each x-coordinate, the y-coordinate is calculated by incrementing the current y-coordinate by 1. The resulting sequence of x-coordinates and y-coordinates constitutes the edge coordinates along the edge.

The process 701 then proceeds to a step 807 where the edge coordinates (preferably x-values) are copied to the next empty column in the edge matrix. Each column in the edge matrix corresponds to an edge in the tile. The sequence of x-values for an edge are inserted into cells within the column in increasing row (scan line index) order, starting at the row corresponding to the start y-value determined at the step 805. An example of an edge matrix will be described later with reference to FIG. 18. Upon completion of the step 807, processing returns to the decision step 803. If the decision step 803 determines that there are no more edges in the tile remaining to be processed, the process 701 ends.

Figure 9:
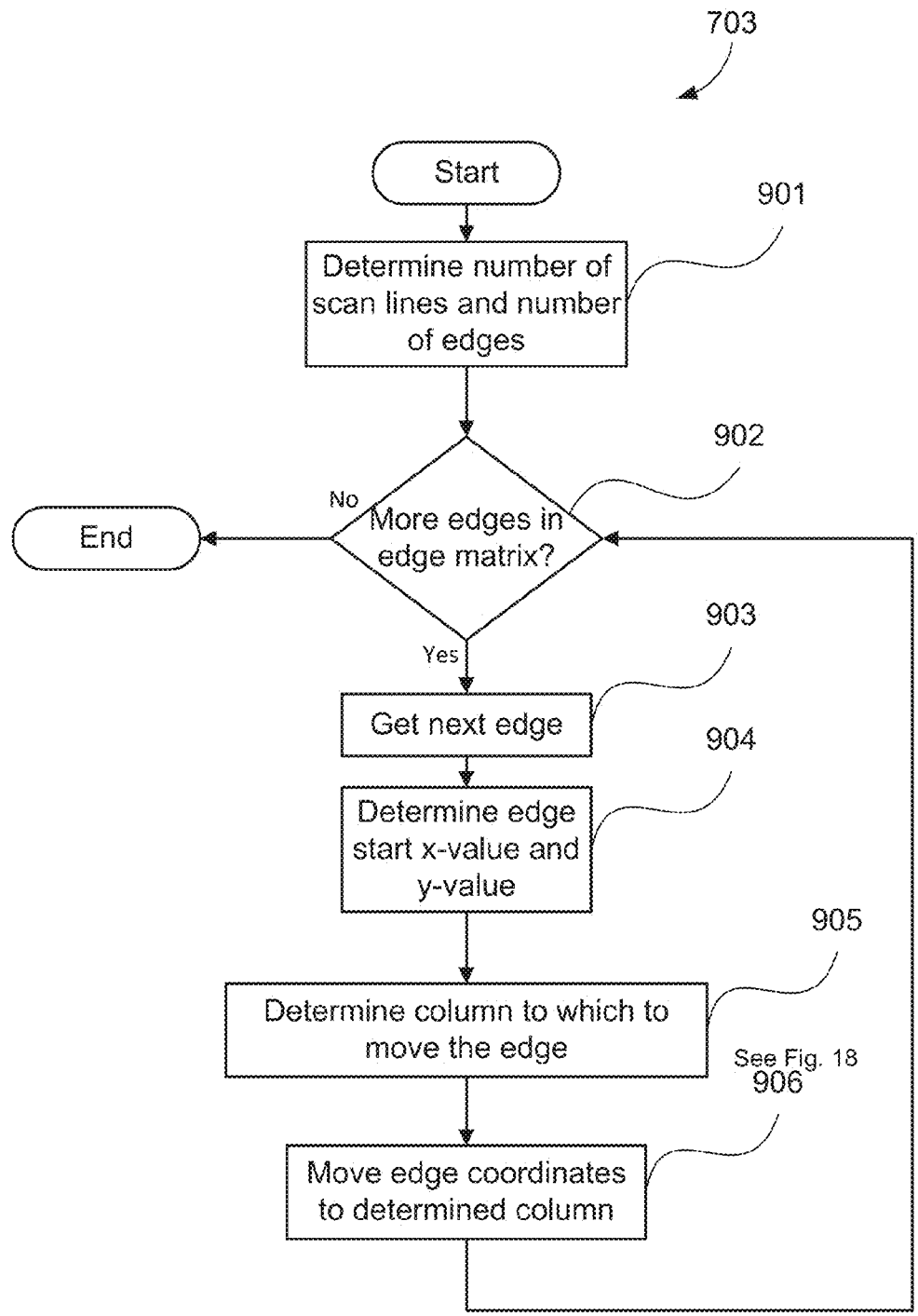
FIG. 9 is a schematic flow diagram illustrating a method of sorting an edge matrix as used in the method of FIG. 7 according to the disclosed PBPP arrangements.
Figure 10:
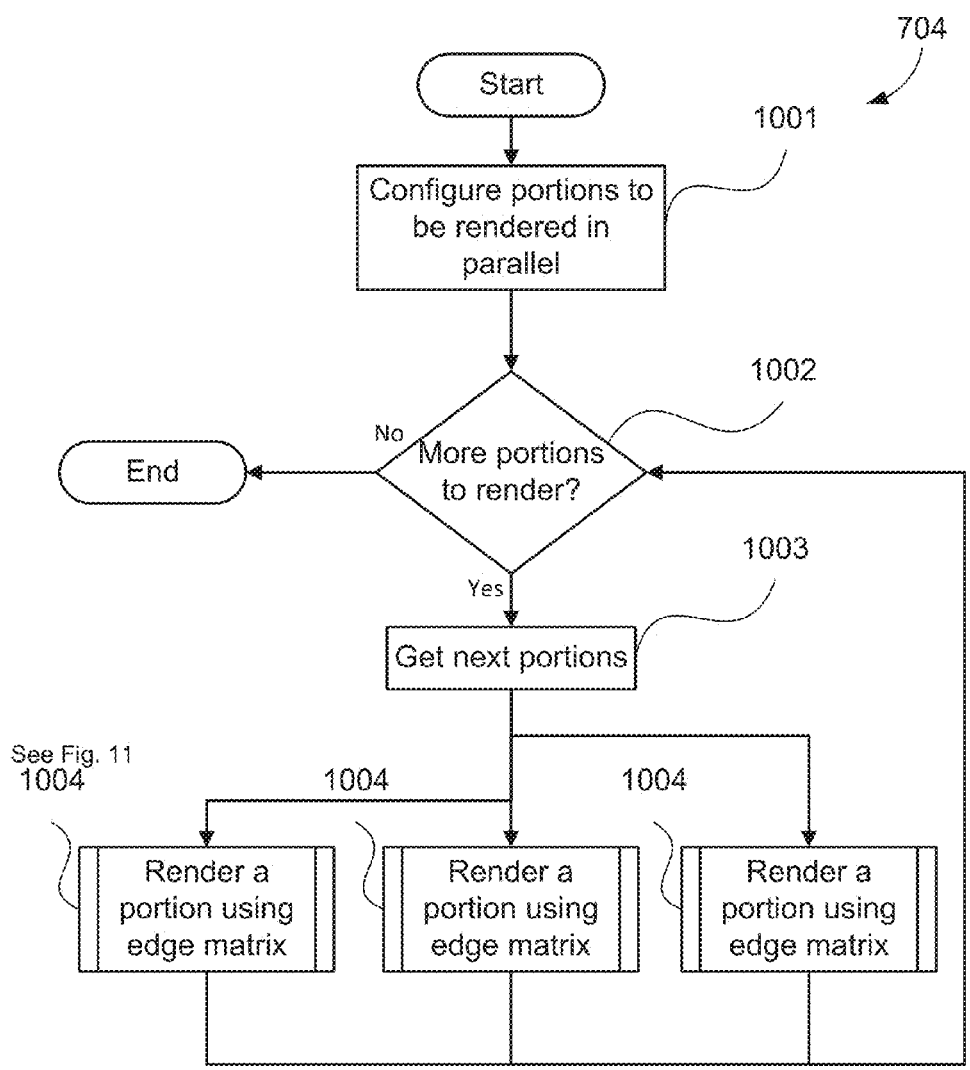
FIG. 10 is a schematic flow diagram illustrating a method of rendering a tile using an edge matrix as used in the method of FIG. 7 according to the disclosed PBPP arrangements.

The process 703 of sorting an edge matrix will now be described with reference to FIG. 9. In the preferred implementation, process 703 is executed using a CPU (e.g., the processor 171 of the controller processors 170 may be a CPU), directed by the controlling program 181. The process 703 starts and proceeds to a step 901 where the number of scan lines and the number of edges in the edge matrix being sorted is determined. This corresponds to the number of rows and columns in the edge matrix being sorted, respectively.

The process 703 proceeds to a decision step 902, where it is determined if there are more edges in the edge matrix to be sorted. If it is determined that there are edges remaining to be sorted, processing proceeds to a step 903, where the next edge is retrieved from the edge matrix. Preferably, edges are retrieved from the edge matrix in order of increasing column index.

Processing then proceeds to a step 904 where the start x-value and y-value of the coordinate of the start of the edge are determined. The step 904 first locates the column of the edge matrix associated with the edge. The coordinate of the start of the edge is then identified by locating the non-empty cell within the column that corresponds to the smallest row number. The start x-value is equal to the contents of the located cell, and the start y-value is equal to the index of the row that contains the cell. Alternatively, the start x-value and y-value may be stored separately from the edge matrix.

The process 703 then proceeds to a step 905 where the column to which to move the edge is determined. This is done by traversing the x-values from left to right along the row of the edge matrix that corresponds to the start y-value. Traversing stops when the cell containing the start x-value is reached. The determined column is the first column in the edge matrix encountered during traversal that contains an x-value that is greater than the determined start x-value. This column identifies where the edge must be moved in order to maintain a sorted edge matrix. If the cell containing the start x-value is reached as the first cell on left, the column is already in its sorted position.

As described above with reference to the step 905, the column to which to move an edge is based on the x-values of edges that intersect the edge start scan line corresponding to the start coordinate of the edge. In some implementations the start x-value of the edge is compared with other x-values on left from the edge start coordinate in the edge start scan line, and the left most column containing an x-value that is greater than the start x-value of the edge is determined as a new location. The edge (i.e. the whole column, alternately referred to as the partition) is moved to the determined location such that the x-values to the left of the original location of the edge along the edge start scan line are monotonically increasing. Because edges are non-intersecting, identifying a column where to move the edge based on the edge start coordinate in this fashion guarantees that edges along all scan lines are sorted, up to the original location of the edge. When sorting of all edges is complete, all x-values along all scan lines will be sorted.

Note that, while x-values along scan lines are used for sorting, not every scan line is typically used for sorting. Only the scan lines on which edges start are used. Because edges are non-intersecting, sorting based on only these scan lines, whilst guaranteeing that all edges will be sorted for all scan lines, is possible.

Processing proceeds to a moving step 906 where the column associated with the edge is moved to the position in the edge matrix identified at the step 905. If the column is already in its sorted position, it does not need to be moved as described below. First, the edge coordinates are removed from the edge matrix, resulting in an empty column Any columns to the right of the empty column are moved the left by one column, over-writing the empty column. Then, edge information in the column to which the edge is to be moved, and the information in the columns to the right of this column is moved to the right by one column. A mapping from sorted edge number to column index in the sorted edge matrix may also be updated to reflect the updated edge order. An example of a sorted edge matrix will be described later with reference to FIG. 18. Upon completion of the step 906, processing returns to the decision step 902. If the decision step 902 determines that there are no more edges in the edge matrix remaining to be processed, the process 703 ends.

The process 703 sorts an existing (unsorted) edge matrix. A similar sorting process can also be used to create a sorted edge matrix. For example, the method starts with rearranging the edge indices by sorting the edge start scan line crossing coordinates directly based on edge information in a fillmap tile, such as edges with starting coordinates and remaining coordinates, and then copies the edge coordinates indexed by sorted edge indices to the corresponding positions in the empty edge matrix (1302). The order of the edge copying is determined by the rearranged edge indices. The process 703 as described above uses an "insertion sort" sorting procedure. Any sorting procedure known in the art may be used.

The process 703 described above with reference to FIG. 9 produces a single sorted edge matrix by moving (sorting) entire columns of an edge matrix. The total number of elements sorted is equal to the number of edges in the tile which is advantageous in comparison with prior-art methods, where sorting is performed on every scan line of the tile, resulting in the total number of elements sorted being equal to the number of crossings of edges with scan lines. More importantly, however, sorting entire columns of an edge matrix is performed only once for the tile; all portions of the tile can be rendered without further sorting. This allows portions to be rendered in isolation and in parallel, avoiding repeated and redundant processing.

In the preferred PBPP arrangement, the edge matrix is represented by a two-dimensional matrix containing rows and columns Each row represents a scan line, and each column represents an edge, containing edge coordinates. In other implementations, edge information may be represented in another form, for example, one of many methods of storing sparse matrices known in the art. Therefore, the term "indexing data structure" is used as a general term to describe the arrangement of edge information into a format that can be quickly indexed for parallel rendering. The term "partition" is used as a general term to describe the edge information associated with a particular edge in an indexing data structure, such as a column in the edge matrix. The sorting procedure described with reference to FIG. 9 can therefore be applied more generally to the sorting of partitions of an edge-based indexing data structure.

It is an object of the disclosed PBPP arrangements to improve efficient rendering of multiple portions of a tile in parallel. This is achieved in one disclosed PBPP arrangement by generating an edge matrix, described previously with reference to FIG. 8 and FIG. 9. The process 704 of rendering the portions of the tile using an edge matrix will now be described with reference to FIG. 10. In the context of the disclosed PBPP arrangements, a portion may be any subset of pixels within the tile being rendered. In the preferred disclosed PBPP arrangement, a portion is a single pixel. In this disclosed PBPP arrangement a plurality of portions, each comprising a single pixel, are concurrently rendered. In another disclosed PBPP arrangement, a portion is the pixels of a scan line within the tile. In this disclosed PBPP arrangement a plurality of portions, each comprising a sequence of pixels in a particular scan line, are concurrently rendered, and the sequence of pixels belonging to a particular portion are rendered in sequence. In the preferred implementation, the process 704 is executed using a GPU (e.g., the processor 172 of the controller processors 170 may be a GPU), directed by the controlling program 181.

The process 704 starts and proceeds to a configuration step 1001 where the portions to be rendered in parallel are configured. As multiple portions can be rendered in parallel, the step 1001 may determine a single portion or a plurality of portions. The portions may be based on the number of portions remaining in the tile, the number of processing elements 310 and 320 in the GPU 301 available for rendering, and the size of the portions.

The process 704 then proceeds to a decision step 1002 where it is determined if there are portions remaining to be rendered. If it is determined that there are more portions to render, processing proceeds to a step 1003 where the next portions to render are determined.

The process 704 then proceeds to a step 1004 where the portions determined at the step 1003 are rendered in parallel using the edge matrix. The number of instances of the step 1004 is equal to the number of portions determined at the step 1001. The step 1004 will be described in more detail later with reference to FIG. 11.

Upon completion of the parallel render steps 1004, processing returns to the decision step 1002. If, at the step 1002 it is decided that there are no remaining portions to be rendered, process 704 ends.

Figure 11:
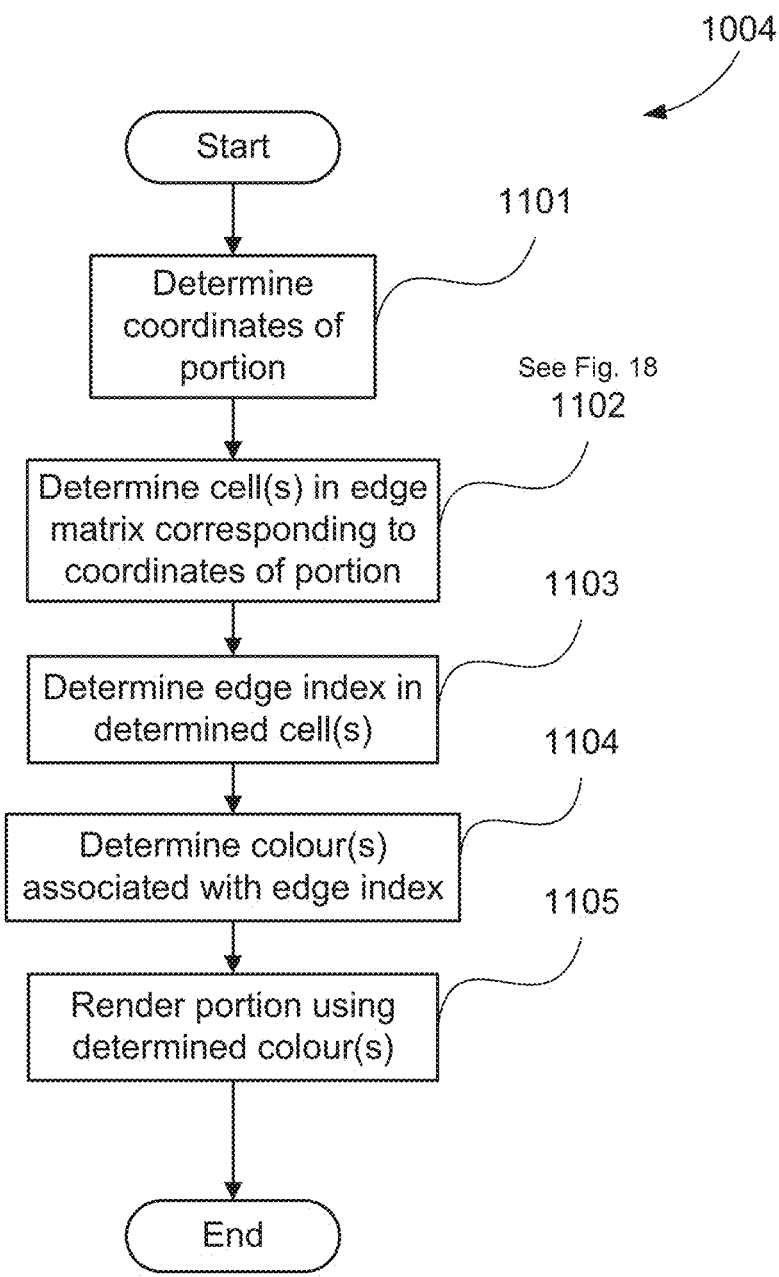
FIG. 11 is a schematic flow diagram illustrating a method of rendering a portion using an edge matrix as used in the method of FIG. 10 according to the disclosed PBPP arrangements.

The process 1004 of rendering a portion of a tile using an edge matrix will now be described with reference to FIG. 11. In the preferred PBPP arrangement, the process 1004 is executed using a GPU (e.g., the processor 172 of the controller processors 170 may be a GPU), directed by the controlling program 181.

The process 1004 starts and proceeds to a step 1101 where the coordinates of the portion being rendered are determined. This information may be determined from the parameters of the particular thread being executed, or the input parameters to the thread, or otherwise. Processing then proceeds to a step 1102, where the cell in the edge matrix that corresponds to the coordinates of the portion is determined. This is done by first locating the row in the edge matrix with a row index that is equal to the y-value of the coordinates determined at the step 1101. Each cell in the located row is then examined in order of increasing column indices, to locate the cell that contains the greatest x-value that is less than or equal to the x-value of the determined coordinates of the portion. If the edge matrix has not been sorted, each cell in the row must be examined. However, if the edge matrix has been sorted as per the process 703 described previously with reference to FIG. 9, the step 1102 can stop examining cells in the row when a cell containing an x-value that is greater than the x-value of the coordinates of the portion has been found. For both an unsorted and a sorted edge matrix, the step 1102 can stop examining cells if a cell containing an x-value that is equal to the x-value of the coordinates of the portion has been found (as the edge associated with this cell is guaranteed to activate the portion). An example of locating the cell in the edge matrix corresponding to the coordinates of a portion will be described later with reference to FIG. 18.

Processing then proceeds to a step 1103 where the edge index in the determined cell is extracted from the cell. Processing then proceeds to a step 1104 where the colour associated with the edge index is determined. In the preferred PBPP arrangement, this is done by locating the fill sequence associated with the edge index, and evaluating the fill sequence to determine the colour as described previously with reference to FIG. 5. If one or more entries in the located fill sequence references an image fill, an image located in the memory 330 may be indexed to determine the colour associated with the coordinates of the portion. This may also involve scaling the image and interpolating pixel values, preferably using the texture unit of a GPU. If one or more entries in the located fill sequence references a gradient fill, the coordinates of the portion may also be used to evaluate a gradient function to determine the colour of the portion.

The process 1004 then proceeds to a rendering step 1105 where the portion is rendered, dependent upon the located fill sequence, to the output buffer in memory 330 using the determined colour. The process 1004 ends upon completion of the step 1105.

Note that if the portion being rendered comprises a plurality of pixels, the steps 1101-1105 may be executed once for every pixel in the portion. Alternatively, for example when the portion is a scan line of pixels, spans of pixels between x-values may first be determined. A span is a sequence of adjoining pixels between the x-values of two edges (or an edge and the edge of the tile) on a scan line. All pixels within a span have the same associated edge index, and can therefore be rendered using the same colour information associated with the edge index. Spans can be determined using the edge matrix by first locating the row in the edge matrix with a row index that is equal to the y-value of the portion's coordinates. If the edge matrix is an unsorted edge matrix, the non-empty cells in the located row are then sorted in order of increasing x-value. Each span is delineated by the x-values of adjacent non-empty cells, and the colour information to use to render each span is identified by the edge index associated with the left-most cell delineating the span. Once spans are determined, the process 1004 can iterate over the spans and render the pixels in each span in sequence.

In another arrangement of the parallel render step 1004, when the edge matrix is a sorted edge matrix, the edge matrix is used to form regions of the tile. There is one region for each edge in the tile, and each edge bounds the left side of its associated region. The boundary of a region is defined by the cells in the sorted edge matrix that belong to edges bounding the region. The boundary on the left side of a region is defined by all the non-empty cells in the associated edge (column of the sorted edge matrix). The boundary on the right side of the region is defined by those non-empty cells that are encountered first when traversing from left to right from cells defining the left side of the region, along the associated row in the sorted edge matrix. Each region can then be rendered separately and in parallel using the determined bounding cells of the region and the fill information associated with the edge bounding the left of the region.

PBPP Arrangement 2

Figure 12:
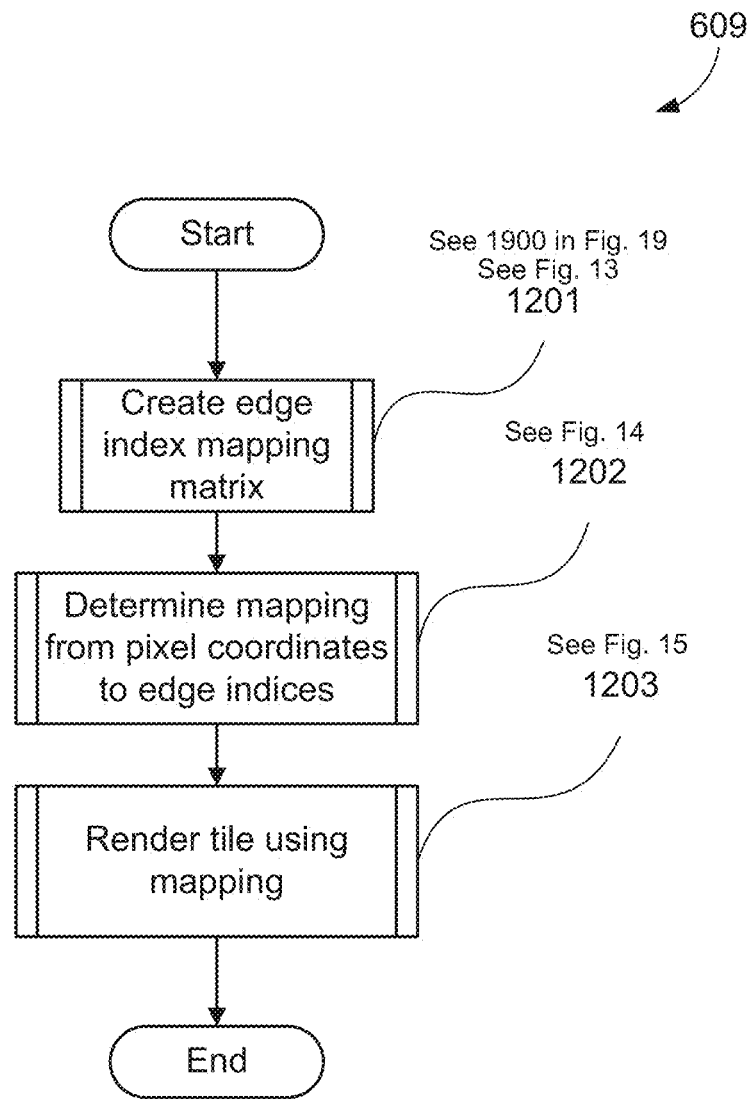
FIG. 12 is a schematic flow diagram illustrating a method of rendering a fillmap tile using an edge index mapping matrix as used in the method of FIG. 6 according to the disclosed PBPP arrangements.

The process 609 of rendering a tile using an edge index mapping render method will now be described with reference to FIG. 12. In the preferred PBPP arrangement, the process 609 is executed using a combination of CPU and GPU controller processors 170, directed by the controlling program 181. The process 609 starts and proceeds to a step 1201 where an edge index mapping matrix is created. The step 1201 will be described in more detail later with reference to FIG. 13.

The process 609 then proceeds to a mapping step 1202, where a mapping from pixel coordinates to edge indices is determined. The step 1202 will be described in more detail later with reference to FIG. 14. Upon completion of the mapping step 1202, processing proceeds to a rendering step 1203, where the tile is rendered using the mapping determined at the step 1202. The step 1203 will be described in more detail later with reference to FIG. 15. The process 609 ends upon completion of the rendering step 1203.

Figure 13:
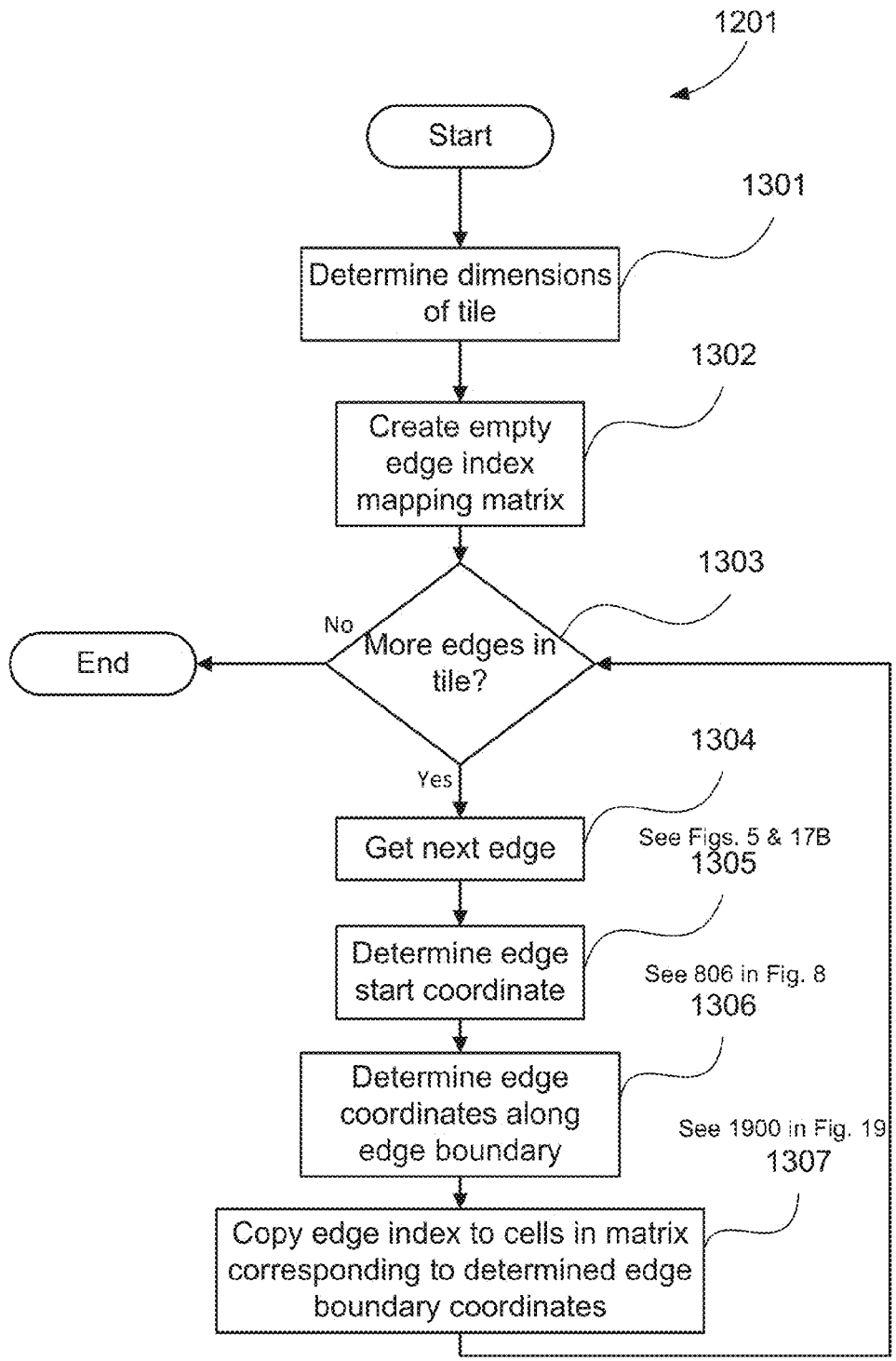
FIG. 13 is a schematic flow diagram illustrating a method of creating an edge index mapping matrix as used in the method of FIG. 12 according to the disclosed PBPP arrangements.

The process 1201 of creating an edge index mapping matrix will now be described with reference to FIG. 13. In the preferred PBPP arrangement, the process 1201 is executed using a CPU (e.g., the processor 171 of the controller processors 170 may be a CPU), directed by the controlling program 181. The process 1201 starts and proceeds to a step 1301 where the dimensions of the tile (in units of pixels) is determined. This information can be found within the header information of the tile. Processing proceeds to a step 1302 where an empty edge index mapping matrix is created. The number of rows in the edge index mapping matrix is equal to the number of scan lines in the tile being rendered (the y-dimension of the tile). The number of columns in the edge index mapping matrix is equal to the width of the tile in pixels (the x-dimension of the tile). The amount of memory allocated to the edge index mapping matrix is configured to allow each cell to store the largest edge index value for the tile. For example, if there are eight edges in the tile, each cell in the edge index mapping matrix must be able to store an edge index of 7 (assuming edge indices start at 0). The remaining steps 1303-1307 serve to populate the edge index mapping matrix with edge information.

The process 1201 proceeds to a decision step 1303, where it is determined if there are edges in the tile remaining to be processed. If it is determined that there are edges remaining to be processed, processing proceeds to a step 1304, where the next edge is retrieved from the tile. As described previously with reference to FIG. 5, edges in a tile are preferably stored as a sequence of edges. Therefore, edges can simply be retrieved one after another from the list of edges. An example of a fillmap tile's sequence of edges is described later with reference to FIG. 17B.

Processing then proceeds to a step 1305 where the coordinate of the start of the edge is determined. This start coordinate corresponds to the first pixel activated on the first scan line the edge intersects. This information can be found in the header information of the edge, as described previously with reference to FIG. 5 and shown in the example described later with reference to FIG. 17B. Process 1201 then proceeds to a step 1306 where the edge coordinates are determined. The process of determining edge coordinates using edges stored in a fillmap tile was described previously with reference to step 806 and FIG. 8.

The process 1201 then proceeds to a step 1307 where the index of the edge is copied to the cells in the edge index mapping matrix that correspond to the edge boundary coordinates determined at the step 1306. An example of an edge index mapping matrix will be described later with reference to FIG. 19. Upon completion of the step 1307, processing returns to the decision step 1303. If the decision step 1303 determines that there are no more edges in the tile remaining to be processed, the process 1201 ends.

Figure 14:
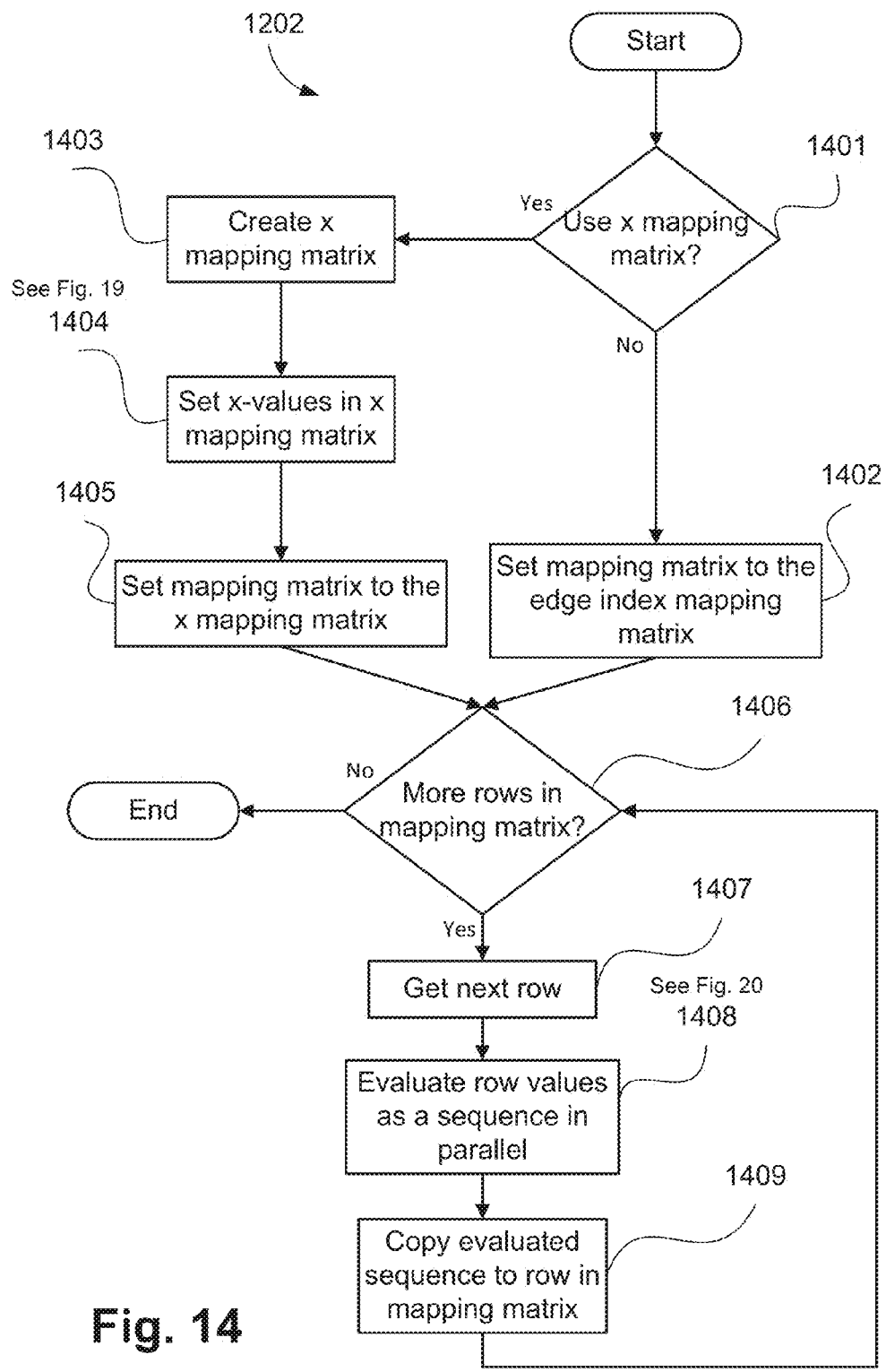
FIG. 14 is a schematic flow diagram illustrating a method of determining a mapping from pixel coordinates to edge indices using an edge index mapping matrix as used in the method of FIG. 12 according to the disclosed PBPP arrangements.

The process 1202 of determining a mapping from pixel coordinates to edge indices using an edge index mapping matrix will now be described with reference to FIG. 14. In the preferred PBPP arrangement, the process 1202 is executed using a GPU (e.g., the processor 172 of the controller processors 170 may be a GPU), directed by the control program 181. The process 1202 starts and proceeds to a decision step 1401 where it is decided whether an x mapping matrix should be used to create the mapping from pixel coordinates to edge indices. An x mapping matrix comprises a smaller amount of data in the memory 330 than an edge index mapping matrix, and it is therefore more efficient to create the mapping using GPUs with smaller amounts of memory 330 or cache 335. In some cases, however, the use of an edge index mapping matrix only may be preferred. For example, the edge index mapping matrix and x mapping matrix may use similar amounts of memory for some tiles.

If it is decided at the step 1401 that an x mapping matrix should not be used, the process 1202 proceeds to a step 1402 where the mapping matrix to be used to form the mapping from pixel coordinates to edge indices is set to be the edge index mapping matrix. Upon completion of the step 1402, processing proceeds to a decision step 1406.

If it is decided at the step 1401 that an x mapping matrix should be used, the process 1202 proceeds to a step 1403 where the x mapping matrix is created in the memory 330. The x mapping matrix has the same dimensions as the edge index mapping matrix. However, the amount of memory allocated to each cell in the x mapping matrix is configured to allow indexes to the maximum number of columns in the x mapping matrix (rather than the maximum number of edges). The x mapping matrix is therefore likely to consume as smaller amount of memory 330 than the edge index mapping matrix. For example, for 8×8 tile the edge index mapping matrix contains 8 rows and 8 columns Each cell in the edge index mapping matrix occupies 8 bits in memory 330 (to allow edge indices up to 255). However, each cell in the corresponding x mapping matrix occupies only 3 bits in memory 330 (to allow x-values up to 7).

Processing then proceeds to a step 1404, where the x-values of cells (column indices) in the x mapping matrix that correspond to non-empty cells in the edge index mapping matrix are set. More specifically, for each non-empty cell in the edge index mapping matrix, the x-value of the associated pixel is written to the corresponding cell in the x mapping matrix. An example of creating an x mapping matrix using an edge index mapping matrix will be described later with reference to FIG. 19. The process 1202 then proceeds to a step 1405 where the mapping matrix to use to form the mapping from pixel coordinates to edge indices is set to be the x mapping matrix. Upon completion of the step 1405, processing proceeds to a decision step 1406.

At the step 1406 of the process 1202, the mapping matrix is either an edge mapping matrix or an x mapping matrix. At this point, the mapping matrix contains mappings from pixel coordinates to edge indices, but only for those pixels along the boundary each edge. The steps 1406-1409 determine the mappings from pixel coordinates to edge indices for the remaining pixels.

If it is decided at the step 1406 that there are more rows in the mapping matrix to process, the process 1202 proceeds to a step 1407 where the next row in the mapping matrix is retrieved. Processing then proceeds to a step 1408 where the values in the next row are evaluated, in parallel, as a sequence. An example of evaluating the values of a row in parallel is described later with reference to FIG. 20. The purpose of the evaluation step 1408 is to determine the mappings from pixel coordinates to edge indices for those pixels in the row that do not yet have an assigned mapping (i.e. those pixels not to the immediate right of the edge). This evaluation is performed using the existing mappings on the boundaries of the edges. The determined mappings can then be used to determine the edge associated with each pixel, and render the pixel.

In the preferred PBPP arrangement, the row values are evaluated using a parallel prefix sum (scan), which can be executed efficiently using a GPU using techniques known in the art. Most commonly, the prefix sum takes as input a sequence of numbers, and outputs the sums of prefixes (running totals) of the input sequence. However, the sum operator can be replaced with any other associative binary operator.

Expressed mathematically, given the input sequence $k_i, i=1$ to $n$, the prefix sum is the series $p_1 = k_1,$ $p_i = f(p_{i-1}, k_i), i=2$ to $n$, where f is an associative binary operator.

If the mapping matrix is an edge index mapping matrix, the row values are edge indices. The preferred operator, when the mapping matrix is an edge index mapping matrix, assigns a value to a position in the sequence that is equal to a value to the left of the position when the value at the position is not currently assigned a mapping. Otherwise, the preferred operator assigns the existing value at the position in the sequence. Expressed mathematically, $f(x, y)=x$ if y is not currently assigned a value, otherwise y. This operator is used repeatedly in parallel to assign the mappings for the row. An example of applying this operator is described later with reference to FIG. 20. An example of determining mappings when the mapping matrix is an edge index mapping matrix will be described later with reference to FIG. 19.

If the mapping matrix is an x mapping matrix, the row values are x-values of pixel coordinates. The preferred operator, when the mapping matrix is an x mapping matrix, assigns a value to a position in the sequence that is equal to the maximum of the existing value at the position (assigning the value of empty cells to −1) and the value to the left of the position. Expressed mathematically, $f(x, y)=\max(x, y)$. This operator is used repeatedly in parallel to assign the mappings for the row. An example of determining mappings when the mapping matrix is an x mapping matrix will be described later with reference to FIG. 19.

Upon completion of the step 1408, all mappings for the row of the mapping matrix have been evaluated. The process 1202 then proceeds to a step 1409 where the evaluated sequence of mappings is copied to the corresponding row in the mapping matrix, replacing the existing mappings for the row. Processing then returns to the decision step 1406. If the decision step 1406 determines that there are no more rows of the mapping matrix to process, the process 1202 ends.

In a preferred disclosed PBPP arrangement, the steps 1407-1409 are executed on multiple rows in parallel. By producing a mapping matrix, each row can be treated as an independent array of data, and can therefore be processed independently and in parallel with other rows.

Figure 15:
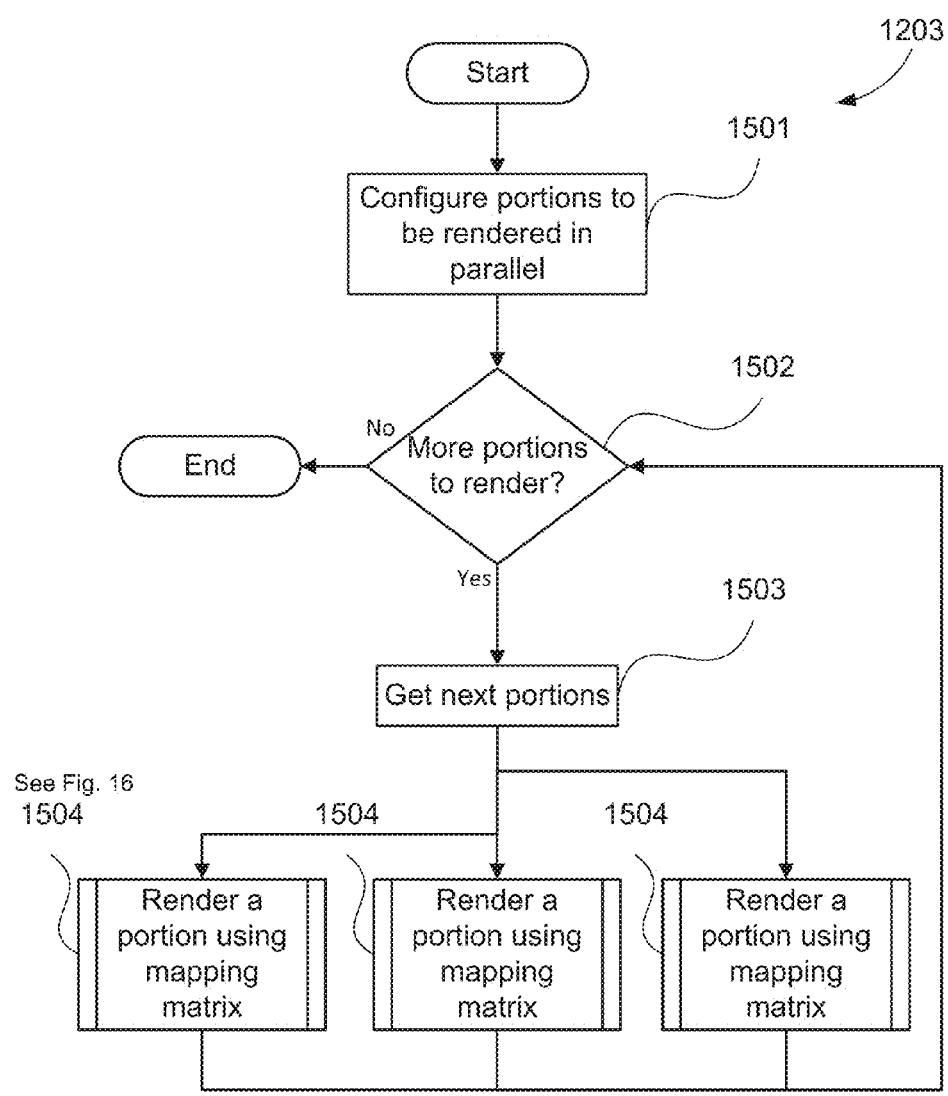
FIG. 15 is a schematic flow diagram illustrating a method of rendering a tile using an edge index mapping matrix as used in the method of FIG. 12 according to the disclosed PBPP arrangements.

The process 1203 of rendering the portions of the tile using a mapping matrix will now be described with reference to FIG. 15. In the preferred implementation, process 1203 is executed using a GPU (e.g., the processor 172 of the controller processors 170 may be a GPU), directed by the control program 181.

The process 1203 starts and proceeds to a configuration step 1501 where the portions to be rendered in parallel are configured. As multiple portions can be rendered in parallel, the step 1501 may determine a single portion or a plurality of portions. The portions may be based on the number of portions remaining in the tile, the number of processing elements 310 and 320 in the GPU 301 available for rendering, and the size of the portions.

The process 1203 then proceeds to a decision step 1502 where it is determined if there are portions remaining to be rendered. If it is determined that there are more portions to render, processing proceeds to a step 1503 where the next portions to render are determined.

The process 1203 then proceeds to a step 1504 where the portions determined at the step 1503 are rendered in parallel using the mapping matrix. The number of instances of the step 1504 is equal to the number of portions determined at the step 1501. The step 1504 will be described in more detail later with reference to FIG. 16.

Upon completion of the parallel steps 1504, processing returns to the decision step 1502. If, at the step 1502, it is decided that there are no remaining portions to be rendered, the process 1203 ends.

Figure 16:
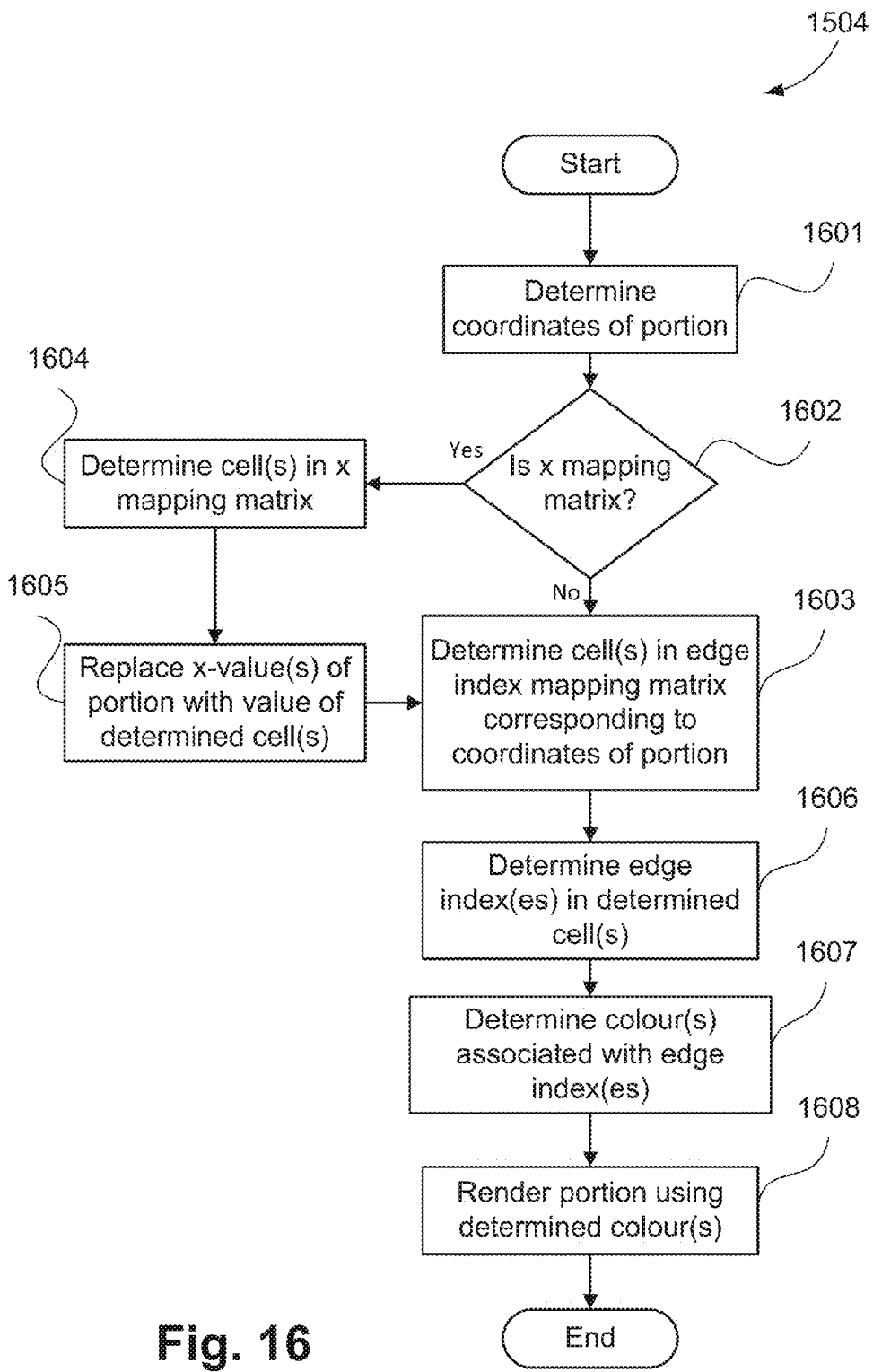
FIG. 16 is a schematic flow diagram illustrating a method of rendering a portion using an edge index mapping matrix as used in the method of FIG. 15 according to the disclosed PBPP arrangements.

The process 1504 of rendering a portion of a tile using an edge index mapping matrix will now be described with reference to FIG. 16. The process 1504 starts and proceeds to a step 1601 where the coordinates of the portion being rendered are determined. This information may be determined from the parameters of the particular thread being executed, or the input parameters or otherwise. Processing then proceeds to a decision step 1602 where it is determined if the mapping matrix is an x mapping matrix. If it is determined at the decision step 1602 that the mapping matrix is an x mapping matrix, process 1504 proceeds to a determining step 1604.

If the mapping matrix is an x mapping matrix, the x mapping matrix is used to determine the x-value of the coordinate of an edge corresponding to the coordinates of the portion. This additional level of indirection must be made prior to looking up the edge index in the edge index mapping matrix. The step 1604 determines the cell in the x mapping matrix that corresponds to the coordinates of the portion. This is done locating the cell on the row with a y-value equal to the y-value of the coordinates of the portion, and a column with an x-value equal to the x-value of the coordinates of the portion. Processing then proceeds to a step 1605 where the x-value of the coordinates determined at the step 1601 is replaced with a cell value extracted from the determined cell in the x mapping matrix. The updated coordinates now indicate the coordinates of the edge that activates the portion. Upon completion of the step 1605, the process 1504 proceeds to a step 1603, therefore, the updated coordinates will be looked up in the edge index mapping matrix.

If it is determined at the decision step 1602 that the mapping matrix is not an x mapping matrix, the process 1504 proceeds to a determining step 1603. At the step 1603, the cell in the edge index mapping matrix that corresponds to the coordinates of the portion is determined. This is done by locating the cell on the row with a y-value equal to the y-value of the coordinates of the portion, and a column with an x-value equal to the x-value of the coordinates of the portion or equal to the updated x-value if x mapping matrix is used. Processing then proceeds to a step 1606 where the edge index in the determined cell is extracted from the cell.

Processing then proceeds to a step 1607 where the colour associated with the edge index is determined. In the preferred implementation, this is done by locating the fill sequence associated with the edge index, and evaluating the fill sequence to determine the colour as described previously with reference to FIG. 5. If one or more entries in the located fill sequence references an image fill, an image located in memory 330 may be indexed to determine the colour associated with the coordinates of the portion. This may also involve scaling the image and interpolating pixel values, preferably using the texture unit of a GPU. If one or more entries in the located fill sequence refer to a gradient fill, the coordinates of the portion may also be used to evaluate a gradient function to determine the colour of the portion.

The process 1504 then proceeds to a rendering step 1608 where the portion is rendered to the output buffer in memory 330 using the determined colour. The process 1504 ends upon completion of the step 1608. Note that if the portion being rendered comprises a plurality of pixels, the steps 1601-1608 may be executed once for every pixel in the portion.

Example(s)/User Case(s)

Figures 17A, 17B:
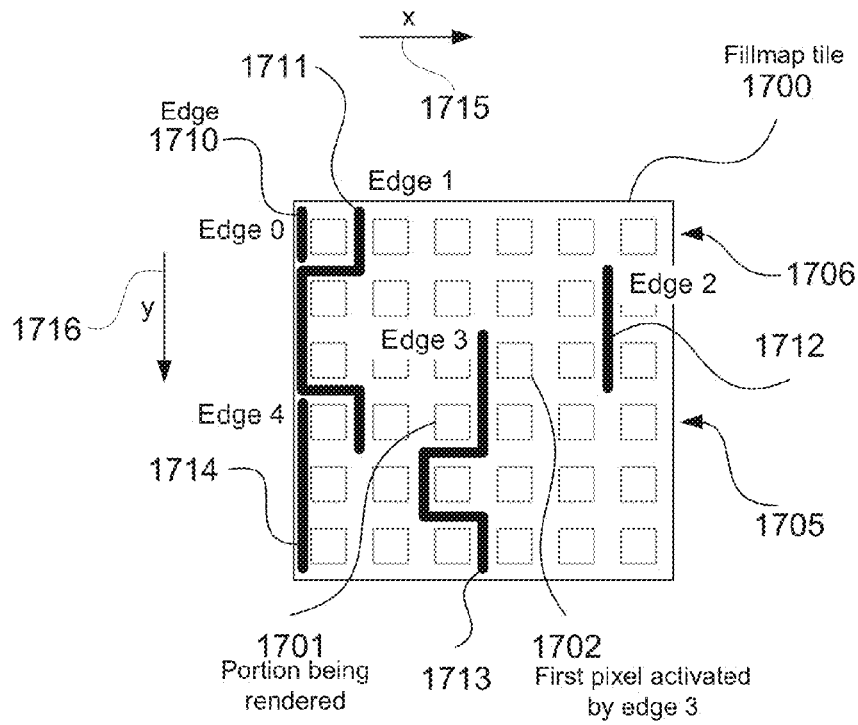
FIG. 17A is an example of a fillmap tile that can be rendered according to the disclosed PBPP arrangements.
FIG. 17B is an example of the representation and storage of edges of the fillmap tile shown in FIG. 17A according to the disclosed PBPP arrangements.

FIG. 17A shows an example of a fillmap tile 1700 that may be rendered using a disclosed PBPP arrangement. The fillmap tile 1700 contains five edges: edge 0 (i.e. 1710), edge 1 (i.e. 1711), edge 2 (i.e. 1712), edge 3 (i.e. 1713), and edge 4 (i.e. 1714). Fill sequences are not shown, but may be associated with the edges 1710-1714 in a manner similar to the example previously described with reference to FIG. 5.

FIG. 17B shows how the edges in fillmap tile 1700 are preferably represented and stored. As described previously with reference to FIG. 5, the edges 1710-1714 are sorted first by start y-value, then edges with the same start y-value are sorted by start x-value, resulting in the sorted order edge 0 (i.e. 1710), edge 1 (i.e. 1711), edge 2 (i.e. 1712), edge 3 (i.e. 1713), then edge 4 (i.e. 1714), as shown in the sorted sequence of edges 1720. For example, the edges 1710 and 1711 have the same start y-value, however, the start x-value for the edge 1711 is greater than the start x-value for the edge 1710, therefore, the edge 1710 is assigned index 0, while the edge 1711 is assigned index 1 in the sorted sequence of edges 1720.

FIG. 17B also shows the stored start coordinate and stored sequence of remaining coordinates for each edge in the fillmap tile 1700. As described previously with reference to FIG. 5, each edge stores the start coordinate, which is the coordinate of the first pixel in the fillmap or fillmap tile that the edge activates, when pixels are traversed in scan line order and from left to right. For example, the first pixel that edge 3 (i.e. 1713) activates is the pixel 1702 with coordinates (x=3, y=2). Therefore, the start coordinate 1721 stored for edge 3 (i.e. 1713) is (3, 2). As described previously with reference to FIG. 5, each edge also contains a sequence of remaining coordinates, preferably stored as a sequence of delta-encoded x-values representing the first pixel activated on each successive scan line the edge intersects. For example, the x-values of the remaining coordinates of the first pixels activated by edge 3 (i.e. 1713) (excluding the first pixel 1702) are x=3, x=2, x=3 (corresponding to successive y-values y=3, y=4, y=5). Applying delta encoding to this sequence results in the stored remaining coordinates 1722. The difference between the start x-value (3) and the first x-value of the remaining coordinates (3) is 0. Therefore, the first stored x-value in the stored remaining coordinates 1722 is 0. The difference between the second x-value of the remaining coordinates (2) and the first x-value of the remaining coordinates (3) is −1. Therefore, the second stored x-value in the stored remaining coordinates 1722 is −1. The remaining element in the stored remaining coordinates 1722 for edge 3 (i.e. 1713) is calculated in a similar manner. Other edges are stored in a similar manner, as shown in FIG. 17B.

Figure 18A:
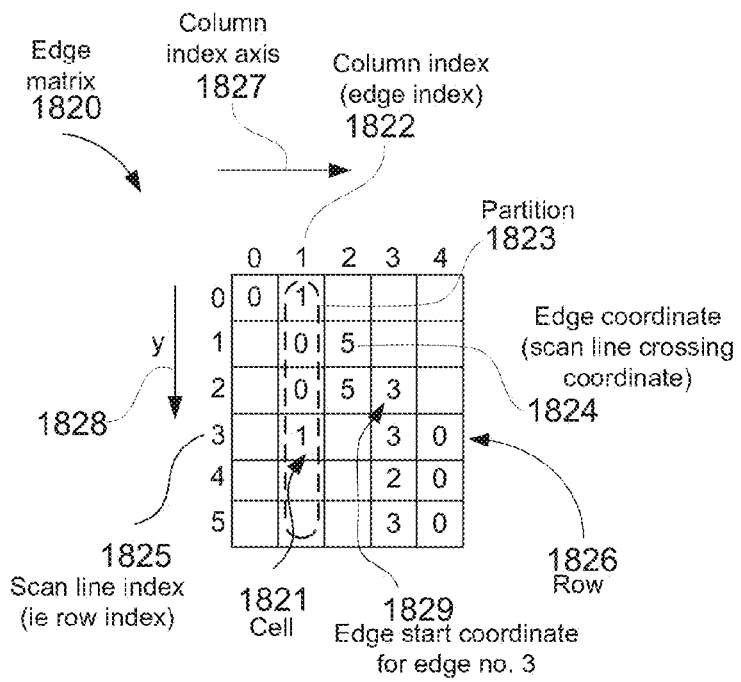
FIG. 18A is an example of an edge matrix corresponding to the fillmap tile shown in FIG. 17A according to the disclosed PBPP arrangements.

FIG. 18A shows an example of an edge matrix 1820 constructed according to the method 701 described previously with reference to FIG. 8, for edges 1710-1714. The edge matrix 1820 contains six rows 0-5 disposed along a Y axis 1828, each row corresponding to a scan line in fillmap tile 1700. For example, row 3 (i.e. 1825) corresponds to scan line 1705. The edge matrix 1820 contains five columns 0-4 disposed along an axis 1827, each column corresponding to an edge 1710-1714 in fillmap tile 1700. The determination of the number of scan lines and edges in a tile according to the step 801 was described previously with reference to FIG. 8. Edges are assigned to columns in the order in which they are represented in the fillmap tile, which was described previously with reference to FIG. 5. Each column contains a non-empty set of edge x coordinates of its associated edge (referenced by a column index), corresponding to the scan lines the edge intersects. Therefore, column 0 contains the edge coordinates for edge 0 (i.e. 1710), column 1 contains the edge coordinates for edge 1 (i.e. 1711), column 2 contains the edge coordinates for edge 2 (i.e. 1712), column 3 contains the edge coordinates for edge 3 (i.e. 1713), and column 4 contains the edge coordinates for edge 4 (i.e. 1714).

Figure 8:
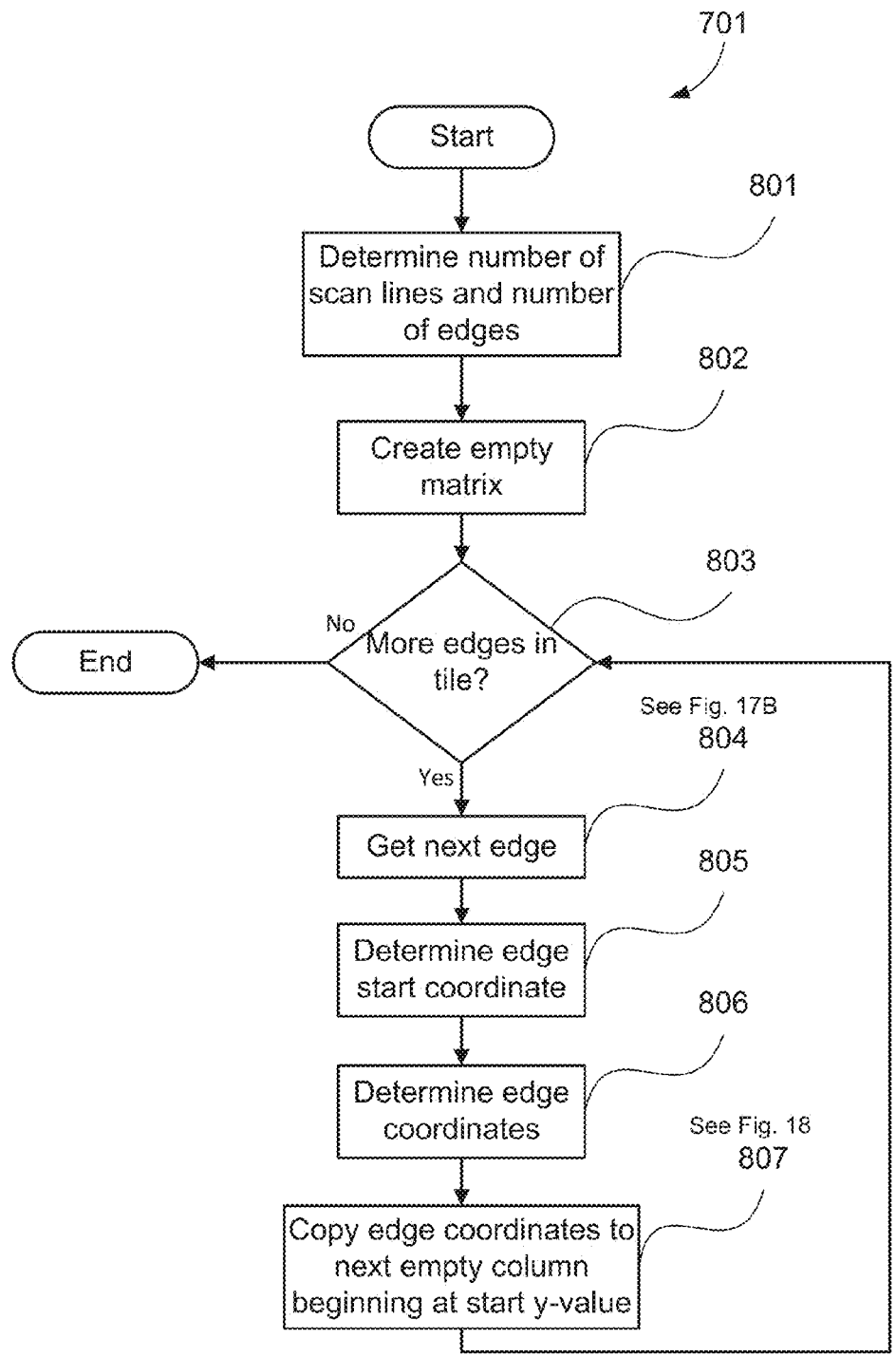
FIG. 8 is a schematic flow diagram illustrating a method of creating an edge matrix as used in the method of FIG. 7 according to the disclosed PBPP arrangements.

The start y-value of an edge, as determined at the step 805 with reference to FIG. 8, is the first scan line the edge intersects. For example, the start y-value of edge 1 (i.e. 1711) is the index of the first scan line 1706, which is 0. In the preferred PBPP arrangement, an edge coordinate is the x-value of an edge's intersection with a scan line. For example, edge 1 (i.e. 1711) intersects scan lines 0, 1, 2 and 3 at x-values 1, 0, 0, and 1, respectively. Therefore, column 1 of edge matrix 1820, contains x-values 1, 0, 0 and 1, starting at the row corresponding to the y-start value, 0, and proceeding to the final scan line the edge 1711 intersects, corresponding to row 3. Edge 1 (i.e. 1711) does not intersect scan lines 4 and 5, so rows 4 and 5 for column 1 of edge matrix 1820 are left empty. The edge coordinates of other edges are inserted into the edge matrix 1820 in a similar manner, in accordance with the steps 806 and 807 described previously with reference to FIG. 8.

An example of rendering a single portion based on the edge matrix, in accordance with the process 1004 as described previously with reference to FIG. 11, will now be described. In this example, the portion being rendered is a single specific pixel 1701, located at spatial coordinates (x=2, y=3) with reference to an X axis 1715 and a Y axis 1716, determined in accordance with the step 1101. To render this specific pixel 1701, the edge matrix 1820 is used to determine the index of the edge that activates the specific pixel 1701. In accordance with the step 1102, the row 1825 with a row index of 3 is first located. Then, the contents of the cells in the located row are examined in order of increasing column indices (column 0 to column 4). In an alternate arrangement, the contents of the cells in the located row can be examined in any other desired order. Empty cells are skipped. When the contents of all non-empty cells in the row 1825 are compared with the specific pixel's x-value of 2, the step 1102 determines that the cell 1821 contains the greatest (non-empty) value (1) that is less than or equal to the pixel's x-value (2). The index of the column containing the determined cell 1821 is the edge index of the corresponding edge, determined in accordance with the step 1103. In this example, an edge index of 1 is determined. The pixel 1701 is then rendered according to the steps 1104 and 1105 based on an edge index of 1, i.e. effectively specifying the corresponding edge having the index 1.

Figure 18B:
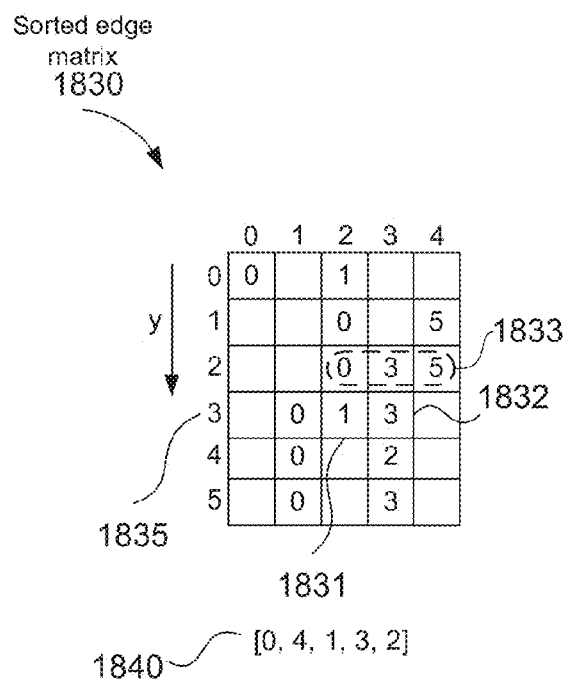
FIG. 18B is an example of a sorted edge matrix corresponding to the edge matrix shown in FIG. 17B according to the disclosed PBPP arrangements.

FIG. 18B shows an example of a sorted edge matrix 1830 constructed according to the method 703 described previously with reference to FIG. 9, for the (unsorted) edge matrix 1820. According to the method 703, an edge matrix is sorted by traversing the columns in the edge matrix. The contents of the column associated with each edge is moved to the first column in the edge matrix that contains an x-value that is greater than the start x-value of the edge, along the row that contains the start x-value. Columns with an index greater than the identified column to which to move the edge are shifted to the right to make way for the moved column. The sorted edge matrix 1830 contains the same data as the unsorted edge matrix 1820, but the columns have been arranged such that for each row (ie scan line), x-values are sorted in increasing (ie ascending) order. For example, the non-empty cells in row 3 (ie 1825) of the (unsorted) edge matrix 1820 contain x-values in the order 1, 3, 0, which is not uniformly increasing in value. Conversely, the non-empty cells in the corresponding row 3 (ie 1835) of the sorted edge matrix 1830 contain x-values in the order 0, 1, 3, which is uniformly increasing in value. In the preferred implementation, the sorted edge matrix 1830 has an associated sequence of mappings 1840 from column indices to sorted edge indices. In an alternate arrangement, the x-values can be sorted in decreasing (ie descending) order. In an alternative method of creating a sorted edge matrix, the edge indices are rearranged (1840) by sorting the scan line crossing coordinates directly based on edge start coordinates in a fillmap tile. Then, the edge coordinates indexed by sorted edge indices (1840) are copied to the empty edge matrix (1302).

An example of rendering a single pixel 1701 located at coordinates (x=2, y=3), in accordance with the process 1004 as described previously with reference to FIG. 11, using a sorted edge matrix 1830 will now be described. In a similar manner to the previous example using an (unsorted) edge matrix 1820, to render this pixel 1701, the sorted edge matrix 1830 is used to determine the index of the edge that activates the pixel 1701. In accordance with the step 1102, the row 1835 with a row index of 3 is first located. Then, the contents of the cells in the located row are examined in order of increasing column indices (column 0 to column 4). Empty cells are skipped. When the contents the first non-empty cell 1832 in row 1835 that contains an x-value greater than the pixel's x-value (x=2) is found, the step 1102 determines that the previous non-empty cell 1831, ie the preceding non-empty cell, contains the greatest value (x=1) that is less than or equal to the pixel's x-value (x=2). The index of the column containing the determined cell 1831 is used to index into the sorted sequence of edge indices 1840, which identifies the edge index associated with the pixel 1701. In this example, a column index of 2 is used to determine an edge index of 1. The pixel 1701 is then rendered according to the steps 1104 and 1105 based on an edge index of 1.

As discussed previously with reference to FIG. 7, the decision as to whether to sort an edge matrix or not may be based on a number of factors. The process of sorting the edge matrix imposes an additional processing load on the overall rendering process. However, during parallel rendering of portions, it is faster to determine the edge associated with a portion using an sorted edge matrix than an unsorted edge matrix. This is because the unsorted edge matrix requires all cells in a row to be searched for every portion. Conversely, the sorted edge matrix requires only a subset of the cells in a row to be searched. When these two elements (sorting and searching) are combined, sorting the edge matrix may be suitable for some tiles but not others. The factors which influence the benefit of sorting the edge matrix include the number of edges and the spatial locality of the edges, which can be determined experimentally.

The previous examples described the rendering of a single pixel using an (unsorted) edge matrix 1820 and a sorted edge matrix 1830. It should be appreciated that multiple pixels can be rendered in parallel on a multi-core controller processor such as a GPU using either form of edge matrix. Thus, the parallel rendering of a tile is accelerated. It should also be appreciated that portions other than single pixels can also be efficiently rendered in parallel using an edge matrix 1820 and 1830. For example, a portion may be an entire scan line. In this case, non-empty cells of the edge matrix 1820 and 1830 indicate the edges between which a plurality of pixels should be output.

FIG. 19A shows an example of an edge index mapping matrix 1900 constructed according to the method 1201 described previously with reference to FIG. 13, for edges 1710-1714 shown in FIG. 17A. The edge index mapping matrix 1900 contains six rows 0-5, each row corresponding to a scan line in fillmap tile 1700. For example, row 3 (ie 1905) corresponds to scan line 1705. The edge index mapping matrix 1900 contains six columns 0-5, each column corresponding to a column of pixels in fillmap tile 1700. The determination of the number of scan lines in a tile and its width (in pixels) according to the step 1301 was described previously with reference to FIG. 13. According to the steps 1303-1307, edge indices have been inserted into the cells of edge index mapping matrix 1900 according to the coordinates of the scan line crossings of each edge. For example, edge 1 (ie 1711) crosses scan lines at coordinates (x=1, y=0), (x=0, y=1), (x=0, y=2) and (x=1, y=3), as shown on FIG. 17A. Therefore, an edge index of 1 has been inserted into (ie substituted into) cells of the edge index mapping matrix 1900 at corresponding locations (x=1, y=0), (x=0, y=1), (x=0, y=2) and (x=1, y=3). The edge index of other edges have been inserted into cells of edge index mapping matrix 1900 in a similar manner.

FIG. 19B shows an example of a mapping from pixel coordinates to edge indices based on an edge index mapping matrix 1900 only. Prior to forming the mapping, the edge index mapping matrix 1900 contains edge indices and empty cells, which are shown hatched in FIG. 19B. To form a mapping 1920 from pixel coordinates to edge indices, the values of these hatched cells must be determined. The process of evaluating a sequence of edge reference values corresponding to a row of a mapping matrix was described previously with reference to the step 1408 of process 1202. Using row 3 (ie 1915) of the edge index mapping matrix 1900 as an example, the corresponding input sequence 1912 of values populating the row 1915, depicted by a dashed ellipse, to be processed is 4, 1, empty, 3, empty, empty. Once the row 1915 is fully populated, ie when all the "empty" cells in the row 1915 have been populated, then the contents of the corresponding fully populated row 1925, depicted by a dashed ellipse, is referred to as a row sequence of edge reference values 1908 corresponding to the input sequence 1912. A sub-set of the row sequence of edge reference values 1908, depicted by a heavy dotted ellipse 1909, is referred to as an sequence of edge reference values. The sequence of edge reference values 1909 is populated with reference values 1, 1 associated with a particular edge index 1907, located at the left hand side of the sequence of edge reference values in the present example. To determine the values of the empty cells in the input sequence 1912, the parallel prefix sum is used, as described previously with reference to step 1408. Using the described operator, the values of the empty cells are determined and the input sequence 1912 becomes the row sequence of edge reference values 1908 (ie 4, 1, 1, 3, 3, 3) as shown in row 3 (ie 1925) of the mapping matrix 1920. Thus, for scan line 3 (ie 1705), the resultant mapping matrix 1920 contains a mapping from pixel coordinates to edge indices. The same process is repeated for all rows of the edge mapping matrix 1900, resulting in the mapping matrix 1920.

An example of rendering a single pixel 1701 located at spatial coordinates (x=2, y=3), in accordance with the process 1504 as described previously with reference to FIG. 16, using a mapping matrix 1920 that is based on an edge index mapping matrix 1900 will now be described. In accordance with the step 1603, the cell 1921 in the mapping matrix 1920 that corresponds to the coordinates of the pixel 1701 (x=2, y=3) is located. In accordance with step 1606, the edge index (edge index 1) in the determined cell 1921 is extracted from the cell 1921. The pixel 1701 is then rendered according to the steps 1607 and 1608 based on an edge index of 1.

Figure 19C:
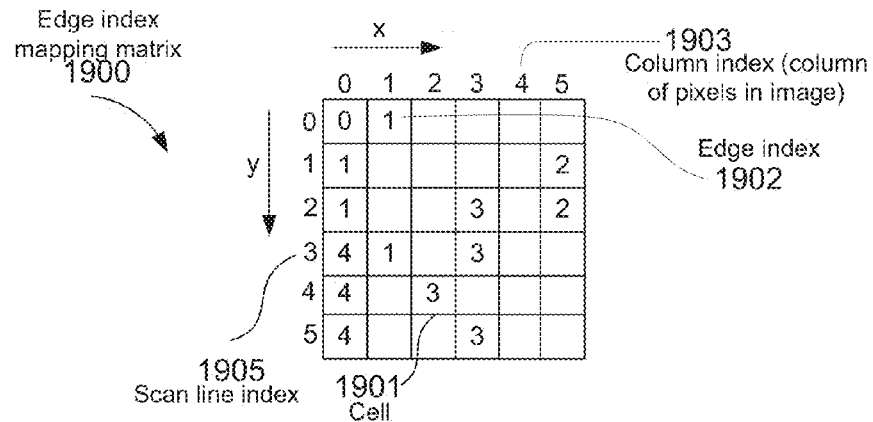
FIG. 19C is an example of determining a mapping from pixel coordinates to edge indices using an x mapping matrix, for the edge index mapping matrix shown in FIG. 19A according to the disclosed PBPP arrangements.
Figure 19C:
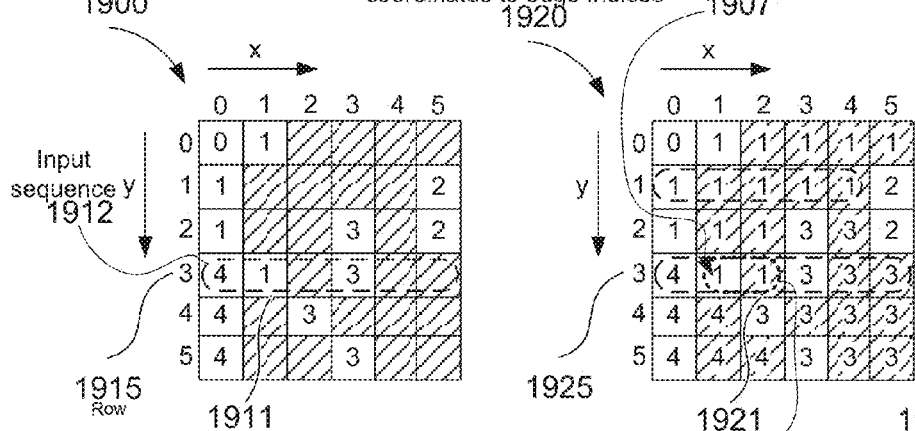
Figure 19C:
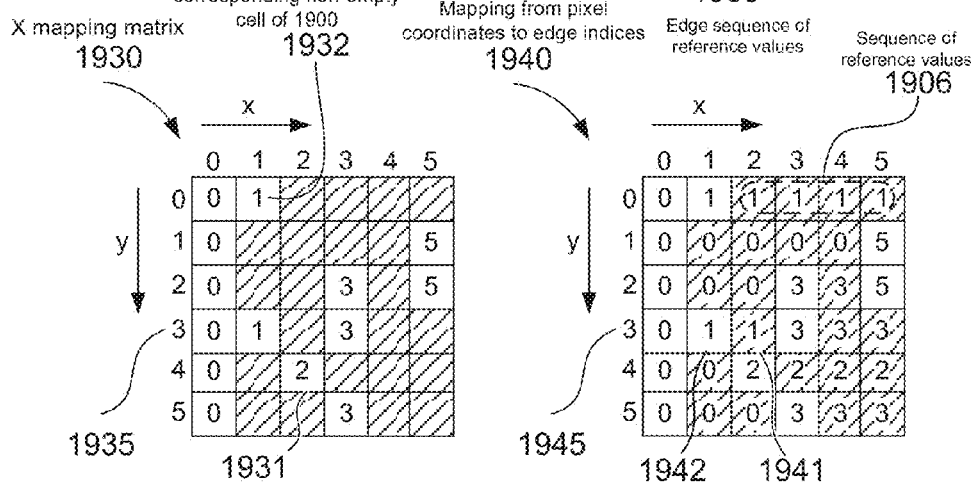

FIG. 19C shows an example of an x mapping matrix 1930 constructed according to the steps 1403 and 1404 of method 1202 described previously with reference to FIG. 14, for the edge index mapping matrix 1900 shown in FIG. 19A. According to the step 1403, the x mapping matrix 1930 has the same dimensions as the edge index mapping matrix 1900. According to the step 1404, the x mapping matrix 1930 contains the x-values of pixels associated with corresponding non-empty cells of the edge index mapping matrix 1900. The x-values of the pixel coordinates correspond to the indices of the columns in the edge index mapping matrix. For example, the cell 1901 in the edge index mapping matrix 1900 contains an edge index of 3. The corresponding cell 1931 in the x mapping matrix 1930 contains the index of cell's column, which is 2.

In a similar manner to the edge index mapping matrix example described previously with reference to FIG. 19B, to form a mapping from pixel coordinates to edge indices, the values of the empty cells in the x mapping matrix 1930 must be determined. These cells are shown as hatched in FIG. 19C. To form a mapping 1940 from pixel coordinates to edge indices, the values of these hatched cells must be determined. The process of evaluating a sequence corresponding to a row of a mapping matrix was described previously with reference to the step 1408 of the process 1202. This sequence in the x mapping matrix is also referred as a sequence of edge reference values, as the x value in the x mapping matrix points to an x coordinate in the edge index mapping matrix where a reference to an edge can be found, therefore, the x values in the x mapping matrix refer to the edges indirectly. Using row 3 (ie 1935) of the x mapping matrix 1930 as an example, the input sequence to be processed is 0, 1, empty, 3, empty, empty. To determine the values of the empty cells, the parallel prefix sum is used, as described previously with reference to the step 1408. Using the "maximum" operator, the values of the empty cells are determined and the sequence becomes 0, 1, 1, 3, 3, 3, as shown in row 3 1945 of the mapping matrix 1940. Thus, for scan line 3 (ie 1705), the resultant mapping matrix 1940 contains a mapping from pixel coordinates to edge indices. The same process is repeated for all rows of the x mapping matrix 1930, resulting in the mapping matrix 1940.

An example of rendering a single pixel 1701 located at coordinates (x=2, y=3), in accordance with the process 1504 as described previously with reference to FIG. 16, using a mapping matrix 1940 that is based on an x mapping matrix 1930 will now be described. In accordance with the step 1604, the cell 1941 in the mapping matrix 1940 that corresponds to the coordinates of the pixel 1701 (x=2, y=3) is located. In accordance with the step 1605, the x-value of the coordinates of the pixel is replaced by the contents of the cell 1941 in the mapping matrix 1940. The coordinates becomes (x=1, y=3). In accordance with the step 1603, the cell 1911 in the edge index mapping matrix 1900 that corresponds to the new coordinates (x=1, y=3) is located. In accordance with the step 1606, the edge index (edge index 1) in the determined cell 1911 is extracted from the cell 1911. The pixel 1701 is then rendered according to the steps 1607 and 1608 based on an edge index of 1.

Figure 20A:
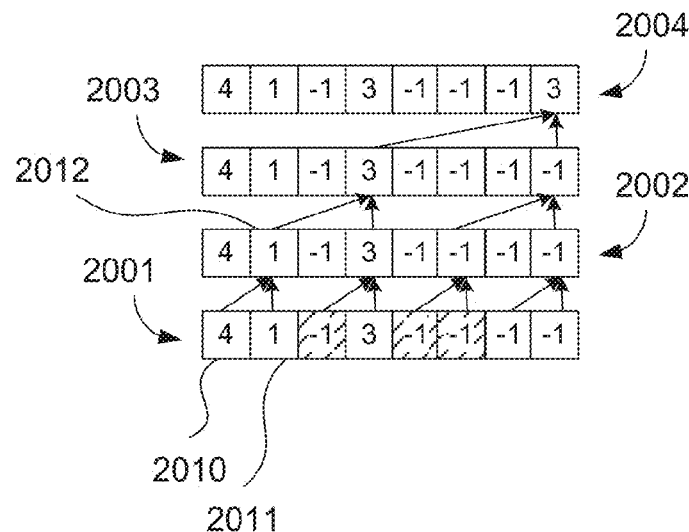
FIGS. 20A and 20B are examples of applying the parallel prefix sum to an edge index mapping matrix according to the disclosed PBPP arrangements.

An example of using the parallel prefix sum to evaluate a sequence of an edge index mapping matrix according to the step 1408 of process 1202 will now be described with reference to FIG. 20. The initial state 2001 of row 3 (ie 1915) of the edge index mapping matrix 1900 is shown in FIG. 20A. The initial state 2001 contains the values of row 3 (ie 1915) of the edge index mapping matrix 1900. The empty cells (shown shaded in FIG. 20A) have been initialised with a value of −1. Preferably, the parallel prefix sum operates on an array with a length that is a power of 2. Therefore, two additional elements, initialised to a value of −1, have been appended to the initial contents 2001 of the row, to produce an array that has a length of 8.

Figure 20B:
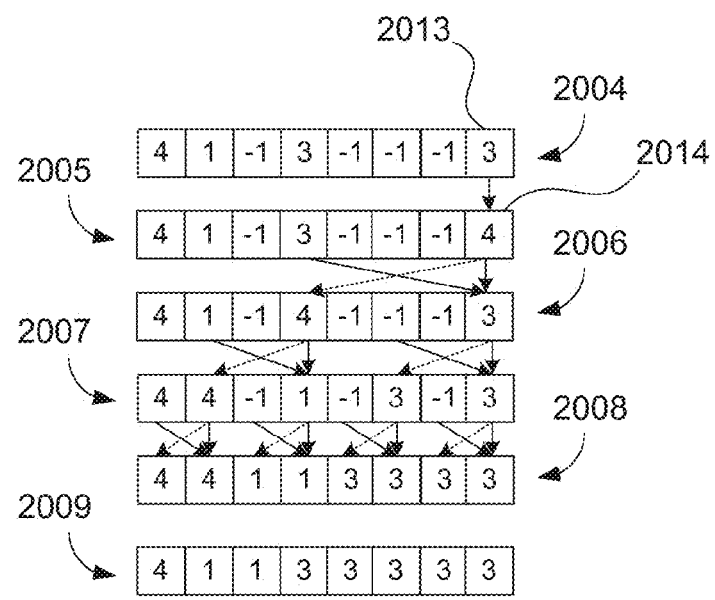

The objective of the parallel prefix sum is to compute the final contents 2009 of the row, shown in FIG. 20B. This is accomplished in two phases, namely up-sweep and down-sweep. During up-sweep and down-sweep the operator is recursively (ie successively) applied to pairs of cells in the row. The operator is applied to the result of the previous stage in either the up-sweep or down-sweep phase. The intermediate contents of each state 2002-2004 during the up-sweep phase for the cells in the row are shown in FIG. 20A. The intermediate contents of each state 2005-2009 during the down-sweep phase for the cells in the row are shown in FIG. 20B.

In transitioning from one state to another, multiple instances of the prefix sum operator are concurrently applied to one or more pairs of elements in parallel. The application of the operator is shown in FIG. 20 as two solid arrows. For example, when transitioning from the initial state 2001 to the second state 2002, the operator is applied four times in parallel, as shown by four pairs of arrows between the initial state 2001 and the second state 2002. For example, applying the operator to element 0 (ie 2010) and element 1 (ie 2011) produces the value of element 1 (ie 2012) in the second state 2002.

As described previously with reference to FIG. 14, when mapping from pixel coordinates to edge indices based on an edge index mapping matrix only, as illustrated in the example shown in FIG. 20, the operator assigns a value to a position in the sequence that is equal to a value to the left of the position when the value at the position is not currently assigned a mapping. Otherwise, the preferred operator assigns the existing value at the position in the sequence. A value of −1 is used to indicate that a value is not currently assigned a mapping. Therefore, as the value at element 1 (ie 2011) in the initial state 2001 is currently assigned a value (1), the value at element 1 (ie 2012) in the second state 2002 is assigned the same value.

The operator is applied in a similar manner during the down-sweep phase, shown in FIG. 20B. However, the "left" and "right" positions are swapped during the down-sweep phase. The contents of the final element 2013 of the initial state of the down-sweep phase 2004 is initialised to the value (4) of the first element 2001 of the initial state of the up-sweep phase 2010. This produces the second state of the down-sweep phase 2005. When transitioning between states 2005-2008 of the down-sweep phase, elements may also be copied between cells, as shown by dashed arrows in FIG. 20B. For example, when transitioning from the second state of the down-sweep phased 2005 to the third state of the down-sweep phase 2006, the value (4) of the final element 2014 of the initial state 2005 is copied to the third element of the second state 2005.

The fourth state 2008 contains the result of applying all iterations of the operator, as well as copying values between cells. To produce the final state 2009, the contents of the fourth state 2008 are shifted to the left by one position, and the result of applying the operator to all elements is appended to the end of the array. The relevant cells of the final state 2009 are then copied into the row 1915 of the edge index mapping matrix 1900. Variations on the described parallel prefix sum process as known in art can also be applied.

Figure 21:
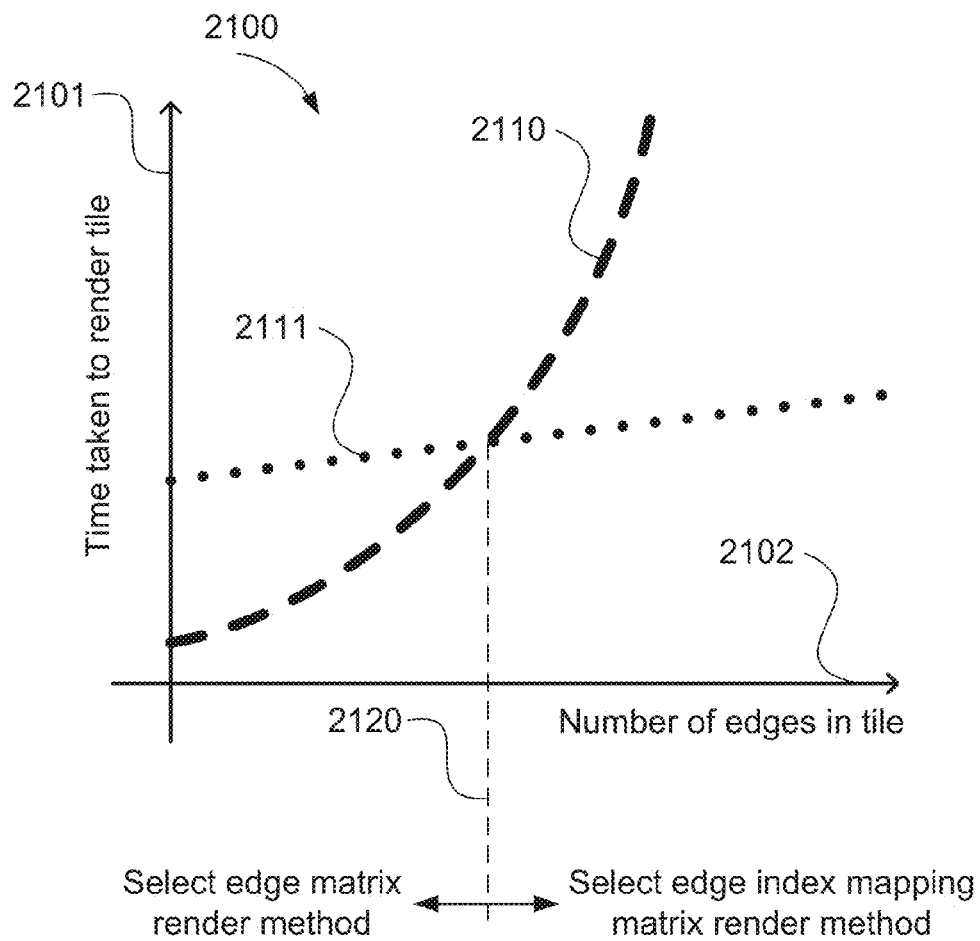
FIG. 21 is an example of selecting between GPU rendering methods based on the number of edges in a tile according to the disclosed PBPP arrangements.
Figure 21:
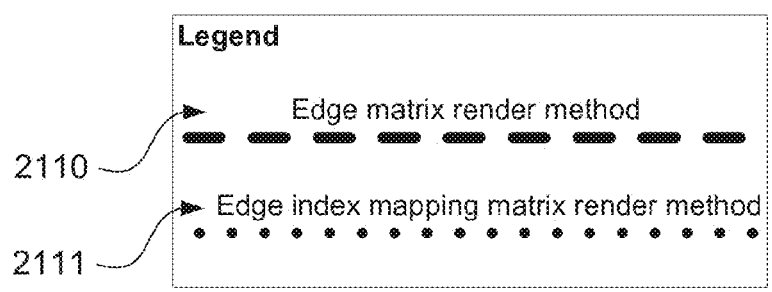

An example of selecting a GPU render method in accordance with step 604, described previously with reference to FIG. 6, will now be described with reference to FIG. 21. The graph 2100 in FIG. 21 shows an example of how the time taken to render a tile 2101 varies for two different GPU render methods 2110 and 2111, depending on the number of edges in the tile 2102.

In this example, a render method that is based on an edge matrix 2110 is fastest for tiles with a number of edges 2102 that is less than a threshold 2120. The step 604 of the process 600 would therefore select the edge matrix render method 2110, described previously with reference to FIG. 7-11. Conversely, for tiles with a number of edges that is greater than a threshold 2120, a render method that is based on an edge mapping 2111 is fastest. The step 604 of the process 600 would therefore select the edge mapping render method 2111, described previously with reference to FIG. 12-16. Data for the graph 2100 could be generated in a number of ways, including by testing each render method with tiles with different numbers of edges and measuring the time taken to render each tile. It should be appreciated that different GPUs have different specifications, including the number of processing elements 310 and 320, and different cache 335 sizes. Therefore, the shape and slope of each curve shown in the graph 2100, and therefore the threshold 2120 may vary for different GPU architectures. Further, there may be a plurality of thresholds that determine which of a plurality of render methods are suitable for a given tile.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive. Accordingly, although the description is directed primarily to region based intermediate representations of images in the form of fillmaps having edges and fills, other region based intermediate representations can also be processed using the disclosed PBPP arrangements.

We claim:

1. A method of rendering an image using a plurality of threads, each thread from the plurality of threads being assigned to concurrently render a portion of the image, the method comprising the steps of:
   receiving edge data corresponding to the image to be rendered, the edge data comprising a plurality of edges identified by edge indices, each edge having associated edge scan line crossing coordinates;
   arranging the edge scan line crossing coordinates associated with the edges into a plurality of partitions indexed by the edge indices to form an indexing data structure that is randomly accessible by means of a coordinate of a portion of the image;
   wherein each partition in the indexing data structure comprises a list of said edge scan line crossing coordinates associated with an edge that is identified by the edge index indexing the partition; and
   rendering the portions of the image concurrently, each portion being rendered by a corresponding assigned thread by identifying and by randomly accessing a partition in the indexing data structure using a coordinate of said portion in the image, at least one edge in the indexing data structure associated with said portion of the image.

2. A method according to claim 1, wherein the rendering step further comprises randomly accessing the partitions using the coordinate of said portion of the image to retrieve an edge scan line crossing coordinate corresponding to the coordinate of said portion.

3. A method according to claim 1, wherein the partitions are in the form of columns in the indexing data structure, the columns being indexed by the edge indices disposed along an X axis, the indexing data structure having rows indexed by scan line indices disposed along a Y axis, and wherein the rendering step comprises, in regard to a portion of the image, the steps of:
 locating a row of the indexing data structure having a spatial Y coordinate value equal to a spatial Y coordinate value of the portion;
 comparing edge scan line crossing coordinates in the located row to a value of a spatial X coordinate of the portion;
 identifying the edge scan line crossing coordinate having the greatest value that is less than or equal to the value of the spatial X coordinate value of the portion;
 specifying, using the edge index of the column containing the identified edge scan line crossing coordinate, said at least one edge in the indexing data structure associated with said portion of the image; and
 rendering the portions of the image concurrently, each portion being rendered by a corresponding assigned thread, using said at least one edge.

4. A method according to claim 3, further comprising, prior to the rendering step, the step of:
 sorting the indexing data structure to form a sorted indexing data structure by sorting the partitions indexed by the edge indices using at least edge start coordinates of the partitions, so that for each scan line index in the sorted indexing data structure the corresponding edge coordinates are sorted in ascending order.

5. A method according to claim 4, wherein the partitions are in the form of columns in the indexing data structure, the columns being indexed by the edge indices, the indexing data structure having rows indexed by scan line indices, and wherein the rendering step comprises, in regard to a portion of a plurality of portions of the image, the steps of:
 locating a row of the sorted indexing data structure having an index equal to a spatial Y coordinate value of the portion;
 comparing in increasing column index order, edge scan line crossing coordinates in the located row to a value of a spatial X coordinate of the portion to identify an edge scan line crossing coordinate having a value that is greater than the value of the spatial X coordinate of the portion;
 specifying, using the edge index indexing the column in the sorted indexing data structure preceding the column containing the identified edge scan line crossing coordinate, an edge associated with said portion of the image; and
 rendering the plurality of portions of the image concurrently, each portion being rendered by a corresponding assigned thread, using a corresponding specified edge.

6. A method according to claim 4, wherein the rendering step further comprises the steps of:
 for at least one edge index, identifying the bounding cells by traversing the sorted indexing data structure starting from each non-empty cell in the partition associated with said edge index to the first encountered non-empty cell in the sorted indexing data structure;
 determining a region of the image identified by said edge index and the bounding cells; and
 rendering the determined region by at least one thread assigned to said edge.

7. A method according to claim 1, wherein the portions of the image to be rendered are individual pixels, and wherein the rendering step comprises the steps of:
 determining the pixels to be rendered, and their coordinates;
 searching the indexing data structure concurrently, using individual coordinates of said portions in the image, for edge indices corresponding to the individual pixels to be rendered; and
 rendering the individual pixels concurrently dependent upon fill sequences corresponding to edges associated with the edge indices, each individual pixel being rendered concurrently by a corresponding assigned thread.

8. A method according to claim 1, wherein the portions of the image to be rendered are sequences of pixels in scan lines of the image, and wherein the rendering step comprises the steps of:
 determining the sequences of pixels to be rendered and their coordinates;
 determining, using the indexing data structure, and coordinates of said portions in the image, edge indices corresponding to the sequences of pixels to be rendered; and
 rendering the sequences of pixels concurrently dependent upon fill sequences corresponding to edges associated with the edge indices, each sequence of pixels being rendered concurrently by a corresponding assigned thread.

9. A method of rendering an image represented by an intermediate representation, the method comprising the steps of:
 selecting, based upon attributes of the intermediate representation, a rendering method according to claim 1; and
 rendering the intermediate representation using the selected methods.

10. A method of rendering graphics using a plurality of threads, the method comprising:
 receiving edge data corresponding to the graphics to be rendered, the edge data comprising a plurality of edges identified by edge indices, each edge having associated edge scan line crossing coordinates;
 determining a set of edge reference values associated with at least one edge index using the edge scan line crossing coordinates;
 determining an edge index associated with a portion of the graphics by randomly accessing the set of edge reference values by means of a coordinate of the portion of the graphics; and
 rendering the portions of the graphics concurrently, each portion being rendered by an assigned thread using the determined edge index.

11. A method according to claim 10, wherein in the step of determining the set of edge reference values, the set of edge reference values are determined concurrently from the edge data by at least two threads.

12. A method according to claim 10, wherein following the receiving step and prior to the determining step the method comprises the further steps of:

constructing an indexing data structure comprising rows corresponding to scan lines in the graphics, and columns corresponding to columns of pixels in the graphics; and initially populating cells of the indexing data structure with the edge indices according to the coordinates of the scan line crossings of each corresponding edge; wherein the step of determining the set of edge reference values comprises the steps of:

successively applying a plurality of instances of an operator to the contents of one or more pairs of cells in a row of the indexing data structure in a concurrent manner such that upon completion (a) a value at each cell in the row not assigned a value in the initially populated indexing data structure is equal to a value of a cell to the left of the cell and (b) the value at each cell assigned a value in the initially populated indexing data structure is assigned the existing value at the cell; and repeating the successively applying step to all the rows of the indexing data structure.

13. A method according to claim 10, wherein following the receiving step and prior to the determining step the method comprises the further steps of:

constructing a first indexing data structure and a second indexing data structure comprising rows disposed along an X axis corresponding to scan lines in the graphics, and columns disposed along a Y axis corresponding to columns of pixels in the graphics;

initially populating cells of the first indexing data structure with the edge indices according to the coordinates of the scan line crossings of each corresponding edge; and initially populating cells of the second indexing data structure with x values according to the coordinates of the scan line crossings of each corresponding edge; wherein the step of determining the set of edge reference values comprises the steps of:

successively applying a plurality of instances of an operator to the contents of one or more pairs of cells in a row of the second indexing data structure in a concurrent manner such that upon completion (a) a value at each cell in the row not assigned a value in the second indexing data structure is equal to a value of a cell to the left of the cell or otherwise (b) the value at each cell assigned a value in the second indexing data structure is assigned the existing current value at the cell;

repeating the successively applying step to all the rows of the indexing data structure; wherein the step of determining, for each portion, an associated edge index comprises the steps of:

determining a cell value in the second indexing data structure depending upon the coordinates of the portion;

determining an edge index in a cell in the first indexing data structure using the determined cell value and the coordinates of the portion; and rendering the portions of the graphics concurrently, each portion being rendered by the assigned thread using the edge associated with the corresponding determined edge index.

14. A method according to claim 10, wherein each thread from the plurality of threads is assigned to concurrently render a portion of the graphics.

15. An apparatus for rendering an image using a plurality of threads, each thread from the plurality of threads being assigned to concurrently render a portion of the image, the apparatus comprising:

a multi-core processor; and a memory storing a program for directing the processor to perform a method comprising the steps of:

receiving edge data corresponding to the image to be rendered, the edge data comprising a plurality of edges identified by edge indices, each edge having associated edge scan line crossing coordinates;

arranging the edge scan line crossing coordinates associated with the edges into a plurality of partitions indexed by the edge indices to form an indexing data structure that is randomly accessible by means of a coordinate of a portion of the image;

wherein each partition in the indexing data structure comprises a list of said edge scan line crossing coordinates associated with an edge that is identified by the edge index indexing the partition; and rendering the portions of the image concurrently, each portion being rendered by a corresponding assigned thread by identifying and by randomly accessing a partition in the indexing data structure using a coordinate of said portion in the image, at least one edge in the indexing data structure associated with said portion of the image.

16. An apparatus for rendering an image using a plurality of threads, each thread from the plurality of threads being assigned to concurrently render a portion of the image, the apparatus comprising:

a multi-core processor; and a memory storing a program for directing the processor to perform a method comprising the steps of:

receiving edge data corresponding to the image to be rendered, the edge data comprising a plurality of edges identified by edge indices, each edge having associated edge scan line crossing coordinates;

determining a sequence of edge reference values associated with at least one edge index, each edge reference value in the sequence of edge reference values corresponding to a portion of the image associated with an edge index;

determining an edge index associated with a portion by randomly accessing the sequence of edge reference values by means of a coordinate of the portion in the image; and rendering the portions of the image concurrently, each portion being rendered by an assigned thread using the edge associated with a corresponding determined edge index.

17. A computer readable non-transitory memory storage medium storing a software executable computer program for directing a multi-core processor to perform a method of rendering an image using a plurality of threads, each thread from the plurality of threads being assigned to concurrently render a portion of the image, the method comprising the steps of:

receiving edge data corresponding to the image to be rendered, the edge data comprising a plurality of edges identified by edge indices, each edge having associated edge scan line crossing coordinates;

arranging the edge scan line crossing coordinates associated with the edges into a plurality of partitions indexed by the edge indices to form an indexing data structure that is randomly accessible by means of a coordinate of a portion of the image;

wherein each partition in the indexing data structure comprises a list of said edge scan line crossing coordinates associated with an edge that is identified by the edge index indexing the partition; and rendering the portions of the image concurrently, each portion being rendered by a corresponding assigned thread by identifying and by randomly accessing a partition in the indexing data structure using a coordinate of said portion in the image, at least one edge in the indexing data structure associated with said portion of the image.

18. A computer readable non-transitory memory storage medium storing a software executable computer program for directing a multi-core processor to perform a method of rendering an image using a plurality of threads, each thread from the plurality of threads being assigned to concurrently render a portion of the image, the method comprising the steps of:

receiving edge data corresponding to the image to be rendered, the edge data comprising a plurality of edges identified by edge indices, each edge having associated edge scan line crossing coordinates;

determining a sequence of edge reference values associated with at least one edge index, each edge reference value in the sequence of edge reference values corresponding to a portion of the image associated with an edge index;

determining an edge index associated with a portion by randomly accessing the sequence of edge reference values by means of a coordinate of the portion in the image; and rendering the portions of the image concurrently, each portion being rendered by an assigned thread using the edge associated with a corresponding determined edge index.

* * * * *